US009837127B2

United States Patent
Janszen

(10) Patent No.: US 9,837,127 B2
(45) Date of Patent: Dec. 5, 2017

(54) METHOD AND APPARATUS FOR THE INSERTION OF AUDIO CUES IN MEDIA FILES BY POST-PRODUCTION AUDIO AND VIDEO EDITING SYSTEMS

(71) Applicant: mKues, Inc., New York, NY (US)

(72) Inventor: Eric H. Janszen, Lexington, MA (US)

(73) Assignee: mKues, INC., Glov Ridge, NJ (US)

( * ) Notice: Subject to any disclaimer, the term of this patent is extended or adjusted under 35 U.S.C. 154(b) by 0 days.

(21) Appl. No.: 15/218,913

(22) Filed: Jul. 25, 2016

(65) Prior Publication Data

US 2016/0336043 A1 Nov. 17, 2016

Related U.S. Application Data

(63) Continuation-in-part of application No. 14/998,144, filed on Dec. 26, 2015, now abandoned.

(60) Provisional application No. 62/176,904, filed on Dec. 29, 2014.

(51) Int. Cl.

| | |
|---|---|
| *H04N 9/80* | (2006.01) |
| *G11B 27/34* | (2006.01) |
| *H04N 21/81* | (2011.01) |
| *H04N 21/8547* | (2011.01) |
| *G11B 27/02* | (2006.01) |
| *H04N 21/858* | (2011.01) |

(52) U.S. Cl.
CPC .............. *G11B 27/34* (2013.01); *G11B 27/02* (2013.01); *H04N 21/8106* (2013.01); *H04N 21/858* (2013.01); *H04N 21/8547* (2013.01)

(58) Field of Classification Search
CPC .... G11B 27/34; G11B 27/02; H04N 21/8106; H04N 21/858; H04N 21/8547
USPC ....... 386/232, 239, 240, 241, 246, 248, 285, 386/326, 328, 321, 338
See application file for complete search history.

(56) References Cited

U.S. PATENT DOCUMENTS

| | | | | |
|---|---|---|---|---|
| 2009/0131141 | A1* | 5/2009 | Walker .................. | G07F 17/329 463/17 |
| 2010/0306657 | A1* | 12/2010 | Derbyshire ....... | G06F 17/30749 715/727 |
| 2014/0304597 | A1* | 10/2014 | Einstein ............. | H04N 21/2353 715/716 |

\* cited by examiner

*Primary Examiner* — Robert Chevalier

(57) ABSTRACT

A system and method for post-production insertion of audio cues into media files is described, comprising a media transcoder loading into memory a first media file comprising audio tracks arranged along a timeline and an identifier identifying a location on the timeline of the first media file at which an item is to be presented, generating an audio cue tag comprising an audio cue having two or more inaudible audio signals, wherein the audio cue uniquely identifies the item associated with a web page to be accessed by a mobile device, and transcoding the first media file to encode at least some of the one or more audio tracks, embed the audio cue into a first audio track of the first media file, and determining not to compress at least a portion of the first audio track comprising the audio cue while compressing other portions of the first media file.

20 Claims, 11 Drawing Sheets

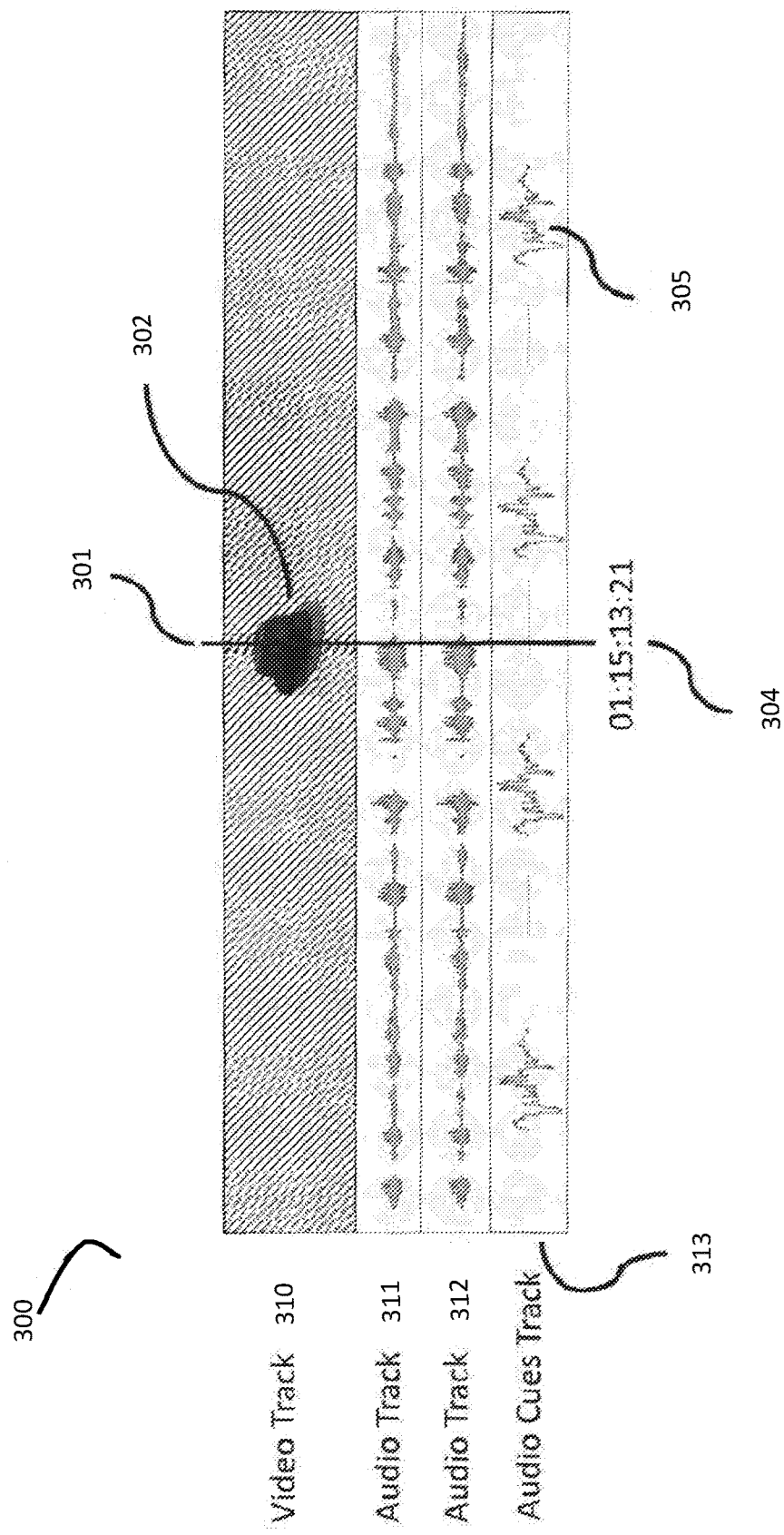

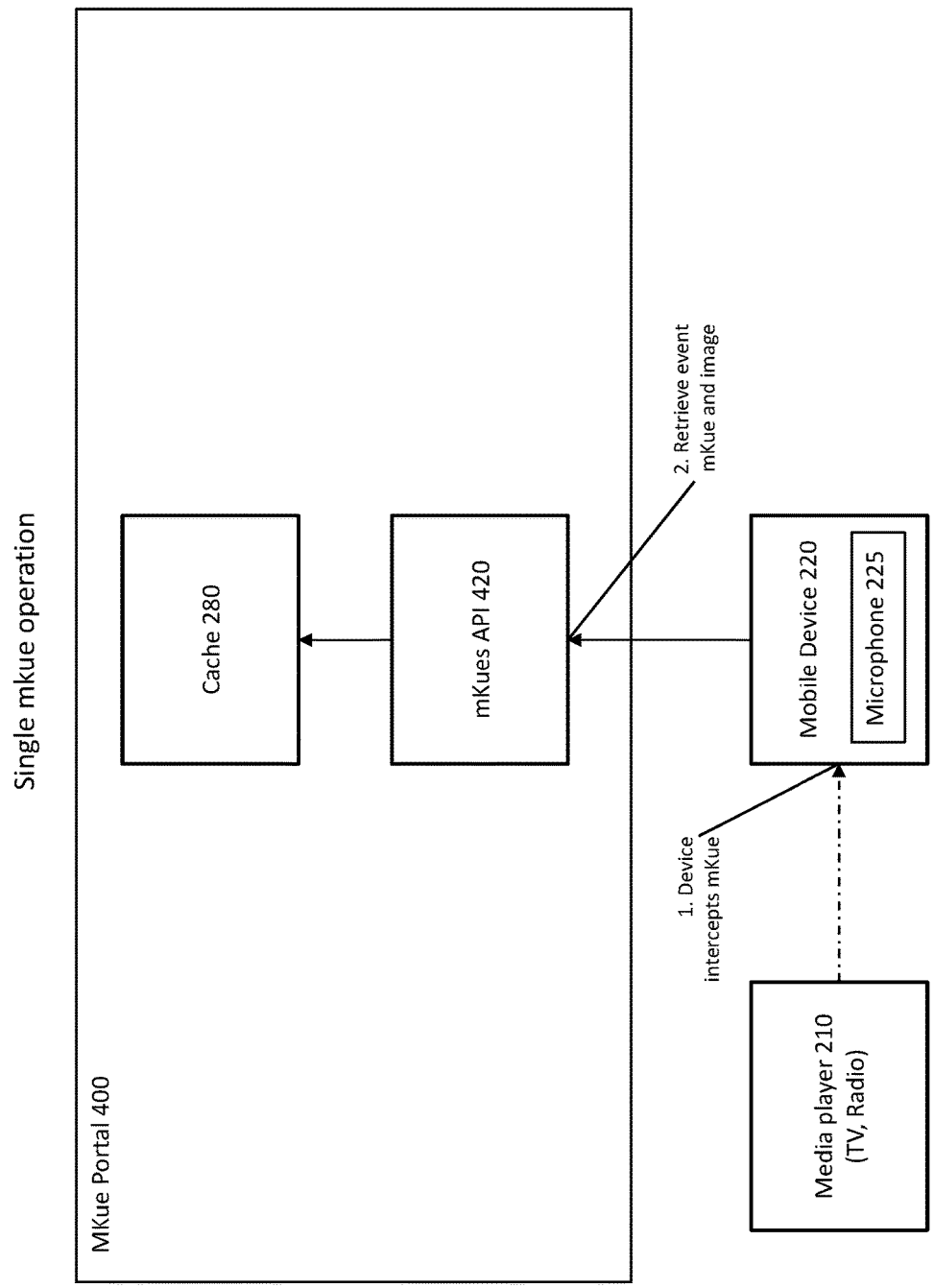

METHOD AND APPARATUS FOR THE INSERTION OF AUDIO CUES IN MEDIA FILES BY POST-PRODUCTION AUDIO AND VIDEO EDITING SYSTEMS

CROSS-REFERENCE TO RELATED APPLICATIONS

The present application claims priority and benefit of U.S. Non-Provisional Utility Patent Application No.: 14/998,144, filed on Dec. 26, 2015 which claims priority to a U.S. Provisional Patent Application No. 62/176,904 filed Dec. 29, 2014, the disclosure of each of which is hereby incorporated by reference in its entirety.

FIELD OF THE INVENTION

The present invention relates to a method and apparatus for the insertion of audio cues in media files by post-production audio and video editing systems, and, more particularly, to a method and apparatus for inserting a unique audio cue identifier into an audio track of an audio or audio-visual file during the audio or video editing process prior to transmitting the finished audio or video media file to a playback outlet.

BACKGROUND OF THE INVENTION

Traditionally, many sound engineers deem that the most important processing of audio and video tracks, either in digital or analog format, takes place just before transmission. Indeed, at such point, signal enhancements such as equalization, filtering, noise cancellation, echo or reverb removal/addition, etc. occur. And depending on the requirements of the application, traditional signal processing tasks, whether for simple or complex projects, can be implemented on general purpose computers.

However, for high end post-production processing projects, such as movies, commercials, shows and other high-production programming, the content processing may require specialized transcoding machines that are equipped with sufficient specialized hardware to enable high level media editing, compression, file type conversion, and any other industry level transcoding process of media content that may have varying lengths, quality and complexity. There is a need in the art for a solution for automated inclusion and embedding of audio cues, referred to herein as mKues, into transcoded media content. Additional details of mKues are detailed and described in the U.S. Pat. No. 8,713,593 which is incorporated herein by reference in its entirety.

SUMMARY OF THE INVENTION

According to embodiments of the invention, mKues, also referred to as audio cues, may comprise one or more signals that are inaudible to humans, such as audio signals in the 16-20 kHz range, and may include two or more frequencies. For the limited purposes of this disclosure the term "inaudible," unless otherwise qualified shall refer to audio signals that cannot be perceived by the human ear. The signature of a given mKue may uniquely identify a particular item. The item, according to various embodiments, may be any person, property, product or service that may have a marketable value, including a product offered for sale, a person, such as a celebrity or a political leader, an animal, such as a pet, a place, such as a tourist attraction, a property, such as a house or a particular piece of real estate, an event, such as a concert or a sporting event, a service, such as a maintenance service, or any other product or thing. The item identified by such a unique audio cue, may be associated with a web page on the internet, or any other information that may be of interest to a consumer, including, without limitation: a web page of a politician, celebrity or other known person; a web page of a product for sale, such as a watch, car, or a hat; a web page for an event, such as a football game; a flyer for a local concert; an ad for a service provider, such as a hair salon or a law firm; or any similar file or a page, web site, or any type and form of information for providing information about the item that may be of interest of a person.

By way of general background, when a media file, such as a movie or a song, is played on a TV or a radio, the inaudible cues, or mkues, inserted into the media file may be played as one or more signals that are outside of human hearing range. As the media file is played, the mkues may be detected, or "heard", by the microphone of a consumer's mobile device application, tablet, laptop or other computing device. The consumer's mobile device may, in response to receiving a particular mkue, send a request, via a wireless or wired network, to a remote server or a remote mkue service web portal to request that the item corresponding to the "heard" mkue be identified. The mkue service may search through a database of mkue tags to find a match between this particular mkue and the available mkues in the database. Upon finding a match, the mkue service may identify the particular item corresponding to the particular mkue. The consumer's mobile device may then receive, from the remote server, item information, such as a link to a web page of the item.

Using this methodology, a media file that comprises mkues embedded into its stream, such as a blockbuster movie encoded to include mkues, may play a scene in which an actor is wearing a particular watch, while simultaneously, in real time, the media file plays the inaudible mkue that is "heard" by the microphone of a consumer's mobile device, in response to which the consumer's device sends an mkue request and receives a web page associated with the particular watch that the actor is wearing on the scene of the movie being played. The consumer may then read up on the watch and decide to buy it.

In some aspects, embodiments of the present invention relate to systems and methods for inserting or embedding inaudible audio signals identifying a particular item of interest, including the item's web page, into a media file, from which the embedded inaudible audio signal may be played to trigger mobile devices of various consumers in the vicinity that "hear" the inaudible audio signal corresponding to a particular item to display the web page associated with the item on such consumers' devices.

The insertion process of mkues, or unique audio cues, into the media files may be done using specialized software operating on specialized transcoding machines, such as for example an AVID media composer software by Avid Technology, Inc. The specialized software may also be sometimes referred to herein as the Audio Cue Insertion Software ("ACTS").

Accordingly, embodiments of the invention, in some instances, are directed to providing a method and apparatus for software-based insertion of a unique audio cue identifier into an audio track of an audio-visual media file during the editing process before the finished media file is broadcast or output. The Audio Cue Insertion Software (ACIS) reads an item identifier tag from a database and generates a unique audio cue to identify an item, person, place or event that appears at a given time code position on the timeline of the media file. The ACIS then generates and inserts a unique audio cue in a separate audio cue track at the given time code location of the media file. When the output file is played out, the audio cue is emitted from the speakers of an output device (e.g., television, movie, etc.) simultaneously with the appearance of the tagged item, person, place or event in the broadcast or showing.

In some aspects, embodiments of the invention relate to systems and methods for efficient and streamlined transcoding of raw media files with mkues in order to insert mkues into the encoded media file in a manner in which the quality of the inserted inaudible mkues is not diminished. In one aspect, the present disclosure relates to a method for transcoding a media file. One embodiment of the method comprises a step of loading into a portion of memory, by a media transcoding machine, a first media file comprising one or more audio tracks arranged along a timeline. Each track may comprise digital audio data. The media transcoding machine may load into a different portion of memory an identifier identifying a location on the timeline of the first media file at which time an item is to be presented. The media transcoding machine may generate an audio cue tag comprising an audio cue having two or more inaudible audio signals. The audio cue may uniquely identify the item. The item may be associated with a web page to be accessed by a remote mobile device in response to the remote mobile device identifying the two or more inaudible audio signals. The media transcoding machine may transcode the first media file. Transcoding may include encoding at least some of the one or more audio tracks. Transcoding may also include embedding the audio cue into a first audio track of the first media file. Media transcoding machine may determine not to compress at least a portion of the first audio track comprising the audio cue while compressing other portions of the first media file. Media transcoding machine may compress one or more other audio tracks of the media file while not compressing at least the portion of the first audio track comprising the audio cue. In some embodiments, media transcoding machine may not compress the entire first audio track comprising the audio cue. In other embodiments, media transcoding machine compresses a portion of the first audio track, while not compressing the portion of the first audio track comprising the audio cue.

In some embodiments the method includes steps in which the media transcoding machine loads into a portion of memory a collection of one or more timing markers corresponding to one or more identifiers at which time one or more items are presented in the first media file. The media transcoding machine may also load into a portion of memory one or more audio cues corresponding to the one or more timing markers. The media transcoding machine may transcode the first media file to comprise the one or more audio cues at the one or more identifiers identified by the one or more timing markers. In some embodiments, the media transcoding machine determines not to compress at least the portion of the first audio track responsive to an indication that the first audio track is not to be compressed. According to some embodiments the media transcoding machine loads into the memory the audio cue to be embedded into the first audio track at a location on a timeline of the first audio track indicated by a timing marker. In further embodiments, generating the audio cue tag includes generating a cue tag including one or more of: a product identifier, a person's name, a country of origin, a geographic location data, and the audio cue. In further embodiments, the steps of the method include generating the audio cue tag, which is implemented responsive to determining that the audio cue tag for the particular item had not yet been created.

In some aspects, the embodiments of the present invention relate to a tangible non-transitory computer-readable media containing instruction to transcode a media file, which when executed by a hardware processor causes the hardware processor to implement several actions. The actions may include loading into a first portion of memory of a media transcoding machine a first media file comprising one or more audio tracks arranged along a timeline, each track comprising digital audio data. The actions may also include loading into a second portion of memory an identifier identifying the location on the timeline of the first media file at which an item is to be presented and an audio cue having two or more inaudible audio signals, wherein the audio cue uniquely identifies the item, and wherein the item is associated with a web page to be accessed by a mobile device in response to the mobile device identifying the two or more inaudible audio signals. The actions may also include transcoding the first media file such as to: (i) encode at least some of the one or more audio tracks, (ii) embed the audio cue into a first audio track of the first media file, and (iii) determine not to compress at least a portion of the first audio track comprising the audio cue while compressing other portions of the first media file.

In some embodiments, the instructions stored on the tangible non-transitory computer-readable media, when executed by the hardware processor further cause the hardware processor to load into a portion of memory a collection of one or more timing markers corresponding to one or more identifiers at which time one or more items are presented in the first media file and one or more audio cues corresponding to the one or more timing markers and transcode the first media file to comprise the one or more audio cues at the one or more identifiers identified by the one or more timing markers. In further embodiments, the tangible instructions stored on the non-transitory computer-readable media, when executed by the hardware processor further cause the hardware processor to determine not to compress at least the portion of the first audio track responsive to an indication that the first audio track is not to be compressed. In still further embodiments, the instructions stored on the tangible non-transitory computer-readable media, when executed by the hardware processor, further cause the hardware processor to embed the audio cue into the first audio track at a location on a timeline of the first audio track indicated by a timing marker. In still further embodiments, the instructions stored on the tangible non-transitory computer-readable media, when executed by the hardware processor, further causes the hardware processor to generate an audio cue tag that includes one or more of: a product identifier, a person's name, a country of origin, a geographic location data, and the audio cue. In yet further embodiments, the instructions stored on the tangible non-transitory computer-readable media, when executed by the hardware processor further cause the hardware processor to generate an audio cue tag responsive to determining that the audio cue tag for the item had not yet been created.

In some aspects, the present disclosure relates to a system for transcoding a media file. The system includes a media transcoding machine configured to load into a first portion of a memory of the media transcoding machine, a first media file comprising one or more audio tracks arranged along a timeline, each track comprising digital audio data. The media transcoding machine is also configured to load into a second portion of the memory of the media transcoding machine, an identifier identifying the location on the timeline of the first media file at which an item is to be presented and audio cue having two or more inaudible audio signals, the audio cue uniquely identifying the item, wherein the item is associated with a web page to be accessed by a mobile device in response to the mobile device identifying the two or more inaudible audio signals. The media transcoding machine is further configured to transcode the first media file, wherein transcoding includes: encoding at least some of the one or more audio tracks, embedding the audio cue into a first audio track of the first media file, and determining not to compress at least a portion of the first audio track comprising the audio cue while compressing other portions of the first media file.

In some embodiments, the media transcoding machine is further configured to load into a portion of memory a collection of one or more timing markers corresponding to one or more identifiers at which time one or more items are presented in the first media file and one or more audio cues corresponding to the one or more timing markers. The media transcoding machine is also configured to transcode the first media file to comprise the one or more audio cues at the one or more identifiers identified by the one or more timing markers. In some embodiments, the media transcoding machine is further configured to determine not to compress at least the portion of the first audio track responsive to an indication that the first audio track is not to be compressed. In still further embodiments, the media transcoding machine comprises specialized hardware that is configured to advance transcoding of the media files. In further embodiments, the media transcoding machine is further configured to load into memory the audio cue to be embedded into the first audio track at a location on a timeline of the first audio track indicated by a timing marker. In yet further embodiments, the media transcoding machine is further configured to generate an audio cue tag that includes one or more of: a product identifier, a person's name, a country of origin, a geographic location data, and the audio cue. In some embodiments, the media transcoding machine is further configured to generate an audio cue tag responsive to determining that the audio cue tag for the item had not yet been created.

In some aspects, the present disclosure relates to a media file stored in a tangible non-transitory computer-readable media. The media file comprises an audio track and a video content. The media file is encoded to include a first copy of an inaudible cue inserted in the audio track at a location in a timeline of the media file at which a product appears in the video content and a second copy of the inaudible cue inserted into the audio track at a second location in the timeline that is offset from the first location by a predetermined time setting. The inaudible cue uniquely identifies the product and corresponds to a universal product code of the product that is retrieved in response to the media file being broadcast via a sound speaker of an output device. The universal product code comprises a numerical identification of a manufacturer of the product and a numerical identification of the product.

The present invention, including its features and advantages, will become more apparent from the following detailed description with reference to the accompanying drawings.

BRIEF DESCRIPTION OF THE DRAWINGS

FIG. 3A is an illustration of an editing system timeline showing implementation of the ACIS system inserting a unique audio cue identifier into an audio track of an audio or video file during the audio or video editing process, according to an embodiment of the present invention.

FIG. 8 illustrates a block diagram of an exemplary system for providing mkue services to consumers sequentially.

DETAILED DESCRIPTION OF THE INVENTION

Figure 1:
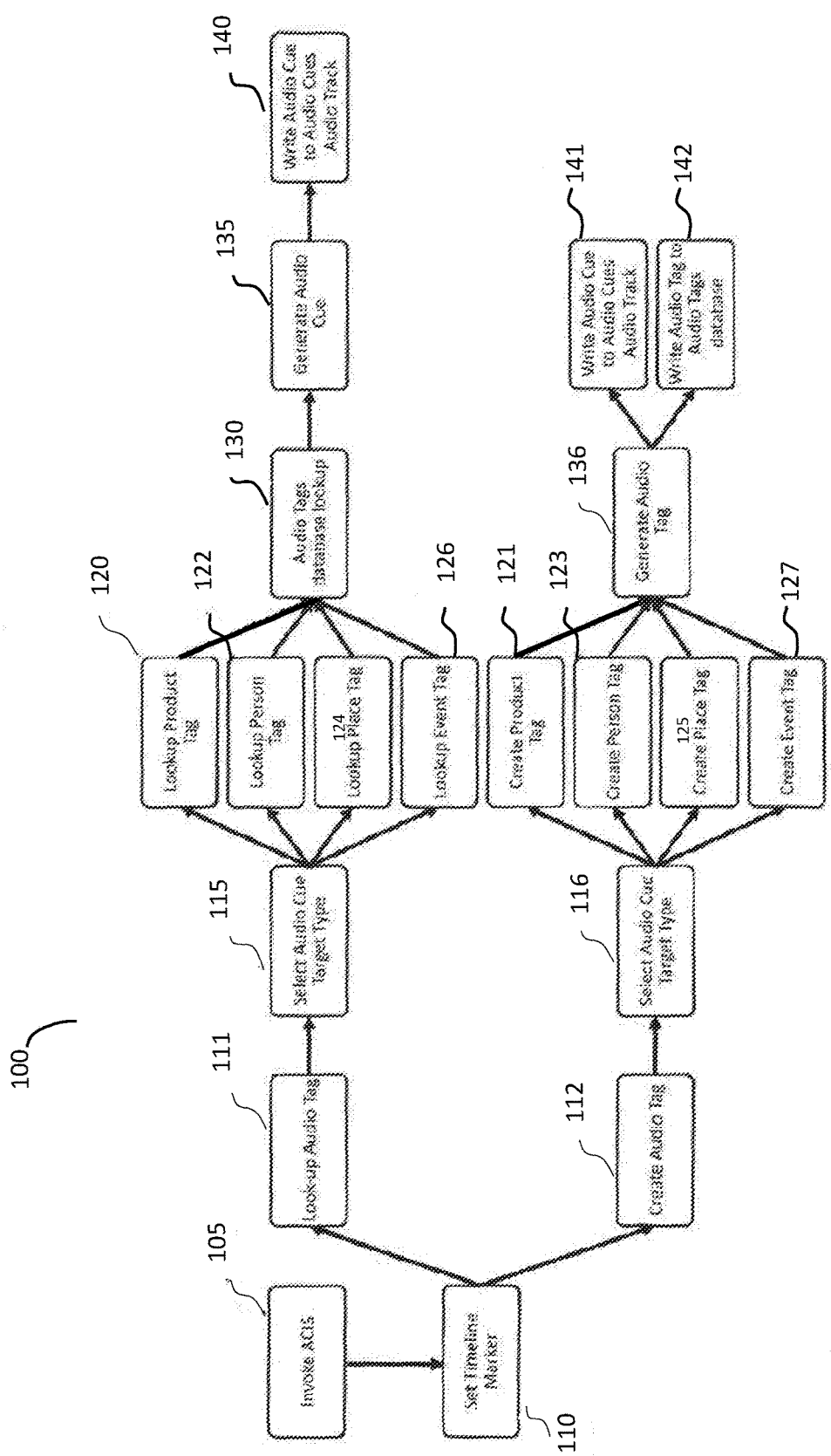
FIG. 1 illustrates a flow chart of a methodology of the Audio Cue Insertion Software (ACIS) program, according to an embodiment of the present invention.
Figure 2:
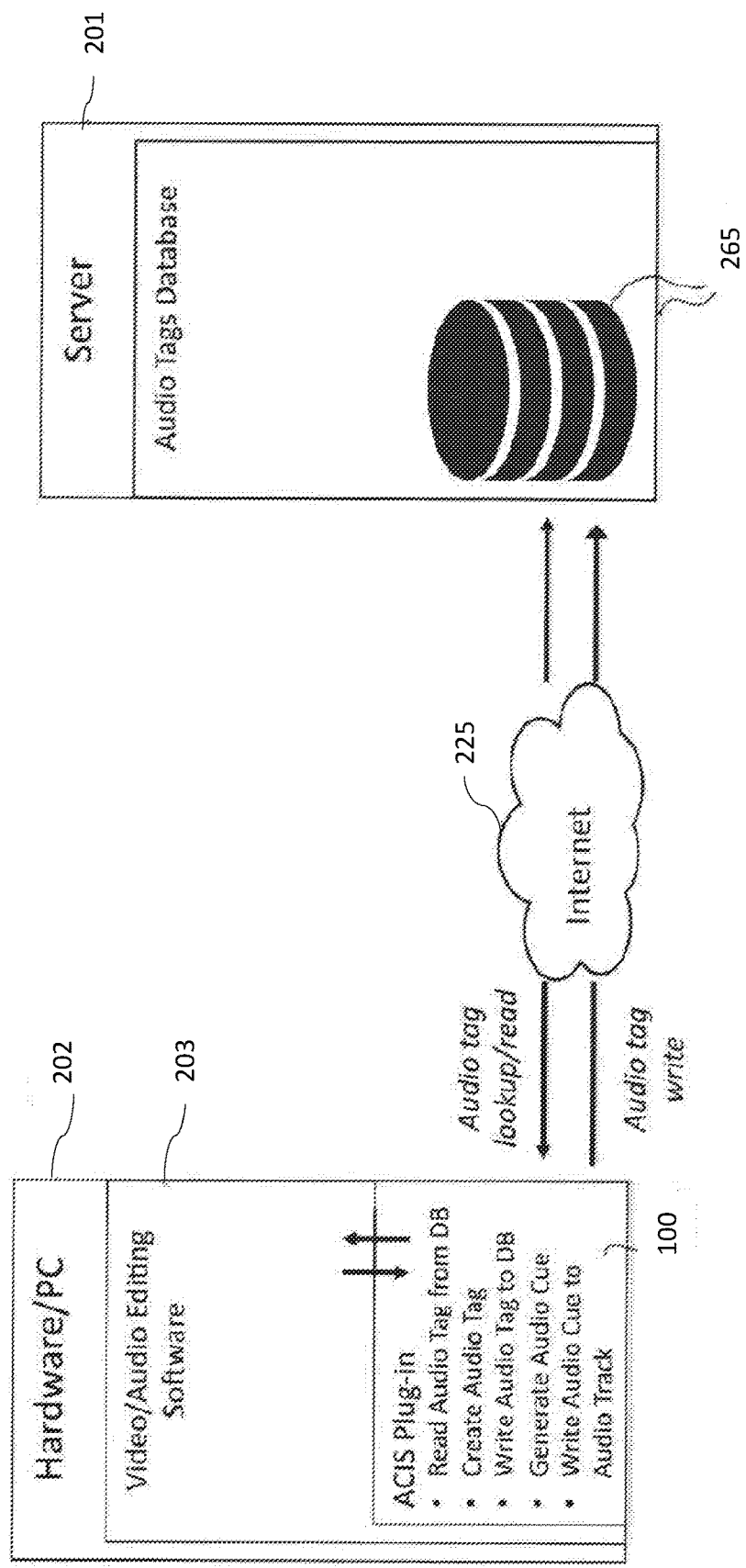
FIG. 2 is an illustration of an implementation hardware architecture of an ACIS system, according to an embodiment of the present invention.

A. Insertion of Audio Cues in Media Files by Post-Production Audio and Video Editing Systems FIGS. 1 through 3 illustrate a method and apparatus for insertion of audio cues, related to and/or to allow for identification of an item, person, place or event, by means of an Audio Cue Insertion Software (ACIS) system (i.e., software program and hardware). The software may be a plug-in of an audio visual Editing System (e.g., Avid Technologies Media Composer, ProTools, etc.) or a stand-alone software program.

Referring now to FIGS. 1, 2, and 3, the flow chart of the methodology and the hardware of the apparatus of the Audio Cue Insertion Software (ACIS) system program 100 (FIG. 1) and system architecture 202 (FIG. 2) are respectively shown. The ACIS system program 100 reads, in step 111, an item identifier tag data 302 (FIG. 3) from a database 205. In step 135, ACIS 100 generates a unique audio cue 303 (FIG. 3) to identify an item, person, place or event that appears at the current time code position 304 on the timeline 309 of media file 300 in the Editing System. In steps 140 (FIG. 1), the ACIS 100 then generates and inserts a unique audio cue 303 (FIG. 3) in a separate audio cues track 313 at the current time code location 304 on the Editing System timeline 309. When the output file is played out, the audio cue is emitted from the loudspeakers of the output device (e.g., television, movie theater, etc.) simultaneously with the appearance of the tagged item, person, place or event in the media content.

Referring now to FIG. 3A, in conjunction with FIGS. 1 and 2, an illustration of the insertion of an audio cue audio visual track(s) of a media file is shown. An exemplary embodiment for insertion of an audio cue utilizing an Editing System 203 in a computer system 202, comprises the steps of:

Step 1: In the timeline of a post-production media file 300, a timeline marker 301 is moved to the location at which time the item to be audio tagged 302 appears in the video track 310 of the media file 300, the ACIS of the editing system is then invoked.

Step 2: A selection is made from two ACIS options, in steps 111 or 112, to either Look-up Audio Tag or Create Audio Tag in the Audio Tags database 205.

Step 3a: If Look-up Audio Tag step 111 is chosen, then the ACIS prompts in step 115 an Audio Cue Target Type: Product 120, Person 122, Place 124, or Event 126. An input form is used containing certain fields depending on the target type selected.

An exemplary Look-up Audio Tag form may include the following fields:
  a. Lookup Product Tag: Universal Product Code field (Returns 5-digit Manufacturer ID Number and 5-digit Item Number)
  b. Lookup Person Tag: First Name field, Middle Name field, Last Name field, Date-of-birth field, Country-of-origin field (Returns First Name, Middle Name, Last Name, Date-of-birth, Country-of-origin)
  c. Lookup Place Tag: Universal Location Code field (Returns geographic location data)
  d. Lookup Event Tag: Tag Type Field Step 4a: Audio Cue Insertion software then looks up the item in a remote Audio Tags database and returns Audio Tag data as needed to provide all necessary values for Product, Person, Place, or Event identification values in the Audio Tag data structure (e.g., 5-digit UPC of a product, images of the product, and video of the product).

Step 5a: Audio Cue Insertion software then generates an Audio Cue from the complete Audio Tag data structure.

Step 6a: Audio Cue Insertion software then writes the Audio Cue one or more times, depending on Audio Cue Insertion Software preferences settings, to the Audio Cues audio track near the current time code point on the timeline, with the audio cue write-to-time code offset before and after the current time code point and number of repetitions of the audio cue determined by Audio Cue Insertion Software preferences.

Step 3b: If Create Audio Tag is chosen then Audio Cue Insertion Software prompts for a target type: Product Person, Place, or Event. An input form is presented used containing certain fields depending on the target type selected.

The \Create Audio Tag form may include the following fields:
  a. Create Product Tag: Universal Product Code field
  b. Create Person Tag: First Name field, Middle Name field, Last Name field, Date-of-birth field, Country-of-origin field
  c. Create Place Tag: Geographic location data
  d. Create Event Tag: Tag Type field Step 4b: The process is the same as 5a above except that Audio Cue Insertion Software writes Audio Tag data to the Audio Tags database and simultaneously Audio Cue Insertion Software generates an Audio Cue from the complete Audio Tag data structure. Other data associated with the audio tag, such as product, person, or place images and video, are added to the database separately.

Step 5b: Same as Step 3b above.

In the foregoing description, the method and apparatus of the present invention have been described with reference to specific examples. It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

Figure 3B:
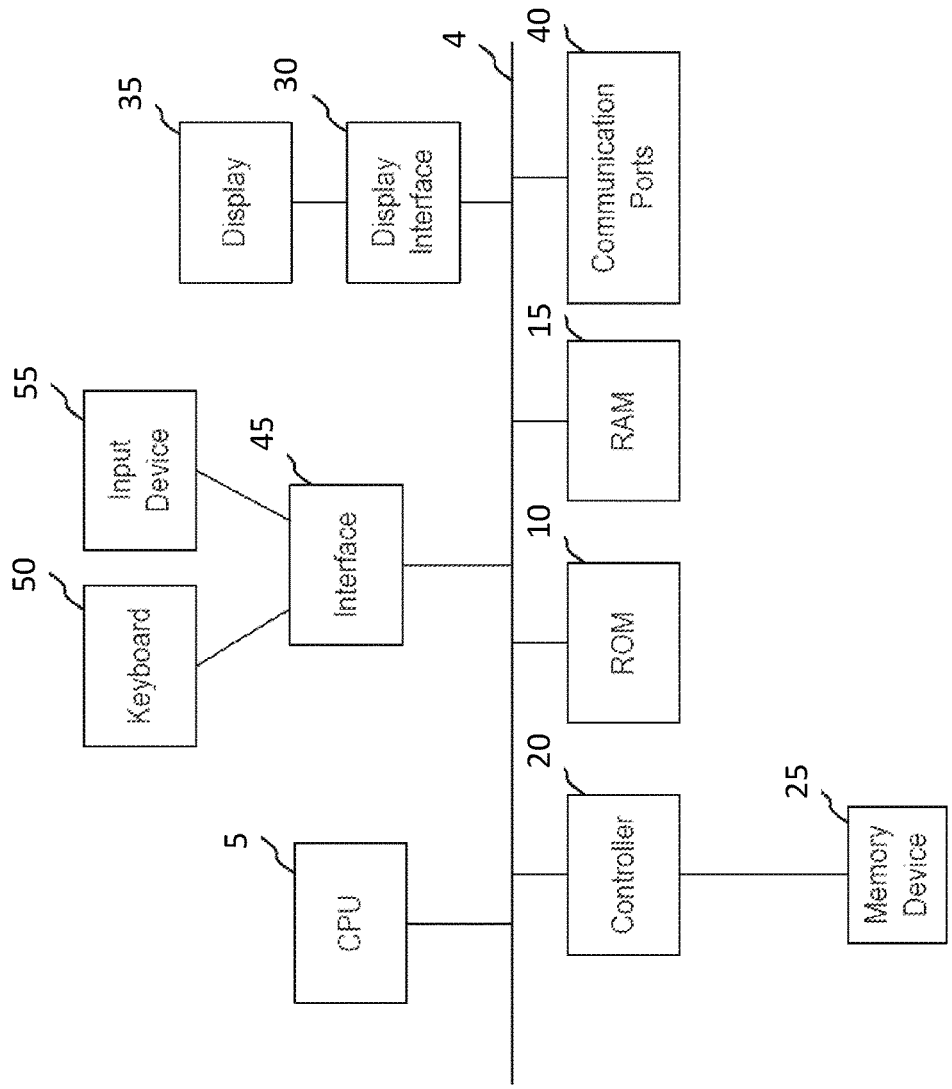
FIG. 3B illustrates a block diagram of an exemplary internal hardware that may be used to contain or implement the various computer or hardware related processes and systems discussed herein.

FIG. 3B depicts a block diagram of exemplary internal hardware that may be used to contain or implement the various computer or hardware related processes and systems discussed herein. A bus 4 serves as the main information highway interconnecting the other illustrated components of the hardware. CPU 5 is the central processing unit of the system, performing calculations and logic operations required to execute a program. CPU 5, alone or in conjunction with one or more of the other elements disclosed herein, is an exemplary processing device, computing device or processor as such terms are used within this disclosure. CPU 5 may comprise specialized hardware logic circuitry tailored to facilitate the implementation of, or implement, the functionalities discussed herein, alone, or in conjunction with the software code functions. Read only memory (ROM) 10 and random access memory (RAM) 15 constitute exemplary memory devices.

A controller 20 interfaces with one or more memory devices 25 to the system bus 4. These one or more memory devices 25 may include, for example, an external or internal DVD drive, a CD ROM drive, a hard drive, flash memory, a USB drive or the like. Additionally, the memory devices 25 may be configured to include individual files for storing any software modules or instructions, auxiliary data, common files for storing groups of results or auxiliary, or one or more databases for storing the result information, auxiliary data, and related information as discussed above.

Still referring to FIG. 3B, program instructions, software or interactive modules for performing functionalities discussed herein or performing any of the functional steps associated with, among other things, analyzing a transport stream, inserting targeted content into a transport stream, and storing targeted data as described herein, may be stored in the ROM 10 and/or the RAM 15, or memory device 25. The program instructions, or the program code implementing the functionalities discussed herein, may be stored on a tangible computer-readable medium such as a compact disk, a digital disk, flash memory, a memory card, a USB drive, an optical disc storage medium, such as a Blu-ray™ disc, on premise or cloud servers, and/or other recording medium.

An optional display interface 30 may permit information from the bus 4 to be displayed on the display 35 in audio, visual, graphic or alphanumeric format. The information may include information related to a current job ticket or thread and associated tasks. Communication with external devices may occur using various communication ports 40. An exemplary communication port 40 may be attached to a communications network, such as the Internet or a local area network, and may enable communication via the Internet or any specific communication network or a connection.

The hardware may also include an interface 45 which allows for receipt of data from input devices such as a keyboard 50, or other input device 55 such as a mouse, a joystick, a touch screen, a remote control, a pointing device, a video input device and/or an audio input device. Computer program logic implementing all or part of the functionality previously described herein may be embodied in various forms, including, but in no way limited to, a source code form, hardware level machine code, a computer executable form, and various intermediate forms (for example, forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Still referring to FIG. 3B, the computer program code which may operate on the CPU 5 or Controller 20, may be fixed in a non-transitory form (for example, a source code form, a computer executable form, an intermediate form, or combinations thereof) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web). Hardware logic (including programmable logic for use with a programmable logic device) implementing all or part of the functionality described herein may be designed using traditional methods of designing as done in the industry.

B. Automated Insertion of Audio Cues in Media Files by Post-Production Media Editing Systems By way of introduction, when a consumer is watching a movie, a video or listening to an audio file, such as music, whether at home, in a movie theater, in her car or at a concert venue, the consumer's mobile device is usually physically with the consumer. This means that the microphone of that consumer's mobile device is capable of receiving and detecting signals at any of these locations. When such a consumer has an application capable of providing mkue services described herein on her mobile device, the mobile device may monitor the sounds and signals of the environment, listening for particular inaudible cues, or mkues 303, which may be inserted into the media file the consumer is watching or to which the consumer is listening. By way of example, in such a scenario, for example, should a particular mkue for a particular type of watch that is displayed in the movie, be inserted into the media file at the time when the watch appears on the movie screen, the consumer's mobile device may detect or "hear" the human inaudible signal of the inserted mkue. The mkue application on the consumer's mobile device may process the mkue in order to identify the unique audio signature of the detected mkue. The consumer's mobile device may then, still in real-time, send a request, over a network to a remote server providing the mkue service to request that the mkue information detected be identified by the back-end mkue service. The mkue software operating on the remote server may then run a search in an mkues database comprising many unique mkues corresponding to many items or product in order to find an mkue whose signature matches the one "heard" by the user's mobile device. The mkue software may then, based on the match, identify that the detected mkue is associated with a particular watch. As all of this happens in real-time, the watch is still, very likely, being displayed on the movie screen at which time the consumer's mobile device may receive or access a range of information on the watch, including the watch's webpage address, price, make and model, store locations and similar information. The consumer's mobile device may then alert the consumer via a vibration or a sound alert on the mobile device that an mkues alert is waiting for her. The consumer may then open and view the received information about the watch, view a webpage for the watch that is just being displayed on the movie screen, and maybe even decide to buy the watch. Embodiments of the present invention deal with systems, methods and solutions for facilitating this particular consumer experience.

Figure 4:
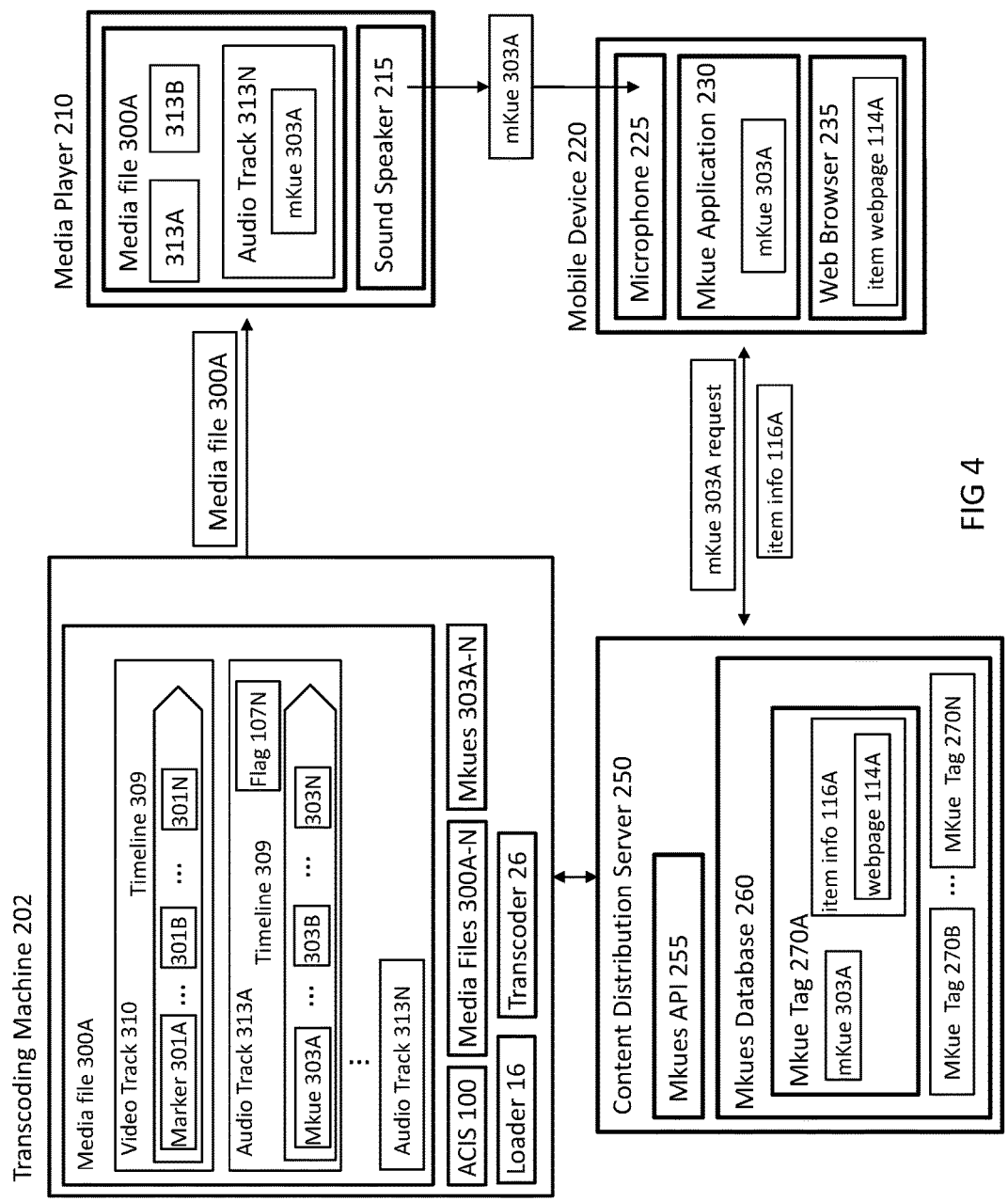
FIG. 4 illustrates a block diagram of an exemplary system for transcoding media files to insert inaudible cues (mkues) and provide the mkue processed media content to consumers' devices.

In that spirit, FIG. 4 illustrates an exemplary embodiment of a system providing a set of functionalities for more efficient and cost-effective insertion of mkues into media files in order to enable a broader distribution of mkue-processed media content to the consumers. In a brief overview, FIG. 4 presents a transcoding machine 202 for processing various media files 300A-N by inserting various mkues 303A-N into the media files 300A-N. The illustrated transcoding machine 202 includes a particular media file 303A, a collection of mkues 303A-N, a collection of media files 300A-N and an Audio Cue Insertion Software ("ACTS") 100. In one embodiment, transcoding machine 202 may insert mkues 303A, 303B through 303N into a particular media file 300A, using loader 16 and transcoder 26. The media file 300A could be, for example, a particular blockbuster movie on a Blu-ray disk. Media file 300A may include a video track 310 with a timeline 309 indicating any number of time markers, such as 301A, 301B through 301N, in which particular items, such as products or persons of interest, appear in the blockbuster movie. Corresponding to the markers 301A, 301B through 301N, there are mkues 303A, 303B through 303N in the timeline of the track 309 in the audio track 313A, each appearing at the same time marker 301A in the timeline 309 and providing an mkue 303 corresponding to a particular item marked by marker 301 appearing in the video.

FIG. 4 further shows a media player 210, such as a Blu-ray player, playing the media file 300A to one or more consumers, where the sound portion of the media file 300A is played from media player 210's sound speaker 215. A consumer's mobile device 220, which may be in the vicinity of the media player 210, has a microphone 225 that can receive and detect the sounds and signals from the media file 300A played from the media player 210. Mobile device 220's microphone 225 may detect a particular mkue 303A audio signals embedded into the media file 303A. Mkue application 230 on the mobile device 220 may identify that the signal detected was indeed mkue 303A and may transmit, via a network, to a remote content distribution server 250, an mkue 303 request. The mkue 303 request may include information about the features of mkue 303 that may be used to find a matching mkue 303 in the mkue database 260 and identify the item corresponding to this particular mkue 303. Content distribution server 250 may receive the mkue 303 request and may operate an mkues database 260 for identifying mkues 303 and an Mkues API 255. Content distribution server 250 may identify, by comparing the information from the mkue 303 request with the entries in the mkue database 260 that the particular mkue 303A is for a particular watch. Content distribution server 250 may identify item info 116A, including the webpage 114A, corresponding to the identified item (i.e. the watch) and provide a response back to the mobile device 220 including item info 116A. Web browser 235 on mobile device 220 of the user may then display the item webpage 114A for the item (i.e., the watch) identified, along with any other item info 116A, which the consumer may then view and decide to make a purchase.

In a greater detail, FIG. 4 shows a transcoding machine 202, which may comprise any type and form of hardware, software or a combination of hardware and software tailored for transcoding of media files 300. Transcoding machine 202 may comprise hardware and/or software codecs, encoders and decoders, compressors and decompressors or any other type and form of circuitry and/or functionality for encoding/decoding and compressing/decompressing of media files 300. Transcoding machine 202 may include any functionality for implementing advanced audio, video and image processing, digital rights management ("DRM") and playout graphics and editing either using hardware, software or a combination of hardware and software. As the hardware implemented transcoding can often be faster than software based transcoding, the transcoding machine 202 may comprise specialized hardware circuitry for implementing the transcoding in accordance with any of the embodiments described herein. Transcoding functions may therefore comprise the functionality for converting various encodings of media files 300 from one encoding or format, to another. Transcoding may comprise converting encodings to and from any of the various audio/visual data file or stream types, such as, for example: phase alternating line encoding ("PAL"), sequentiel couleur avec memoire ("SECAM"), national television system committee ("NTSC"), various DVD and Blu-ray formats, Moving Picture Experts Group (MPEG), including MPEG-2 or MPEG-4 audio/video codecs, MPEG-4 part 14 ("MP4"), Cineon file format, Digital Picture Exchange ("DPX") file format, advanced television systems committee (ATSC) standard, digital video broadcasting (DVB) standard, integrated services digital broadcasting (ISDB) standard, or any other audio/video formats used in television, video or media content industries. Moreover, transcoding may also entail conversion to and from various audio file formats, such as, for example: waveform audio file format ("WAV"), audio interchange file format ("AIFF"), audio file format ("AU"), free lossless audio codec ("FLAC"), Monkey's audio file format, Wav-Pack file format, Apple Lossless Audio Codec ("ALAC"), MPEG-4 Scalable to Lossless ("MPEG-4 SLS"), Audio Video Interleave (AVI) file, Resource Interchange File Format (RIFF), MPEG4-Audio Lossless Coding ("MPEG4-ALS"), MPEG-1 or MPEG-2 Audio Layer III ("MP3"), and others, as character encodings including for example UTF-8, ISO/IEC 8859 and others.

Transcoding machine 202 may comprise any hardware or software or a combination of hardware and software for facilitating high-end media processing, and may include any type and form of processing engines, data centers for processing multiple parallel outputs, specialized graphics processing units ("GPUs"), central processing units ("CPUs"), specialized task processors, specialized codec circuitry, including, but not limited to stream processors, hardware or integrated encoders/decoders or transcoders, specialized memory, and any type and form of specialized circuitry and software for processing of media files. Transcoding machine 202 may be a standalone processing device or a conglomeration of functions and services operating on virtual machines or on a cloud-based technology. Transcoding machine 202 may comprise a software as a service solution, such as AVID Media processing solutions, including but not limited to the tools such as: AVID Artists Suite, AVID Media Suite, AVID Storage Suite, AVID Studio Suite, AVID Media Composer and other media processing tools, functions and applications. Transcoder machine 202 may be a specialized hardware/software solution, that may include any functionality of any of the: AmberFin iCR Transcode, Appear TV, Zencoder by BrightCove, Mamba by DVEO, Private Cloud Encoding Service by Encoding.com, Muse Live HEVC by Envivio, 1RU Mkito X H.264 by Haivision and ProMedia Live by Harmonic. Specialized hardware, including graphics circuitry, may be used to further facilitate the computation intensive processing of media files 300.

A media file 300 may be any image, audio, video or any other type of media or a multi-media file. A media file 300 may be any audio, video or image file implemented on a computing device or in any machine readable format. For example, a media file 300 may be any type and form of an audio/video file, including: Audio Video Interleave (AVI) file, Resource Interchange File Format (RIFF), Moving Picture Experts Group (MPEG), VOB file, MP4 file, M2TS file, MOV file, 3GP file, MKV file, as well as any files processed by codecs such as DivX, XVID, MP3 or AAC codecs. A media file 300 may also be any type and form of audio files including .wav files, .aiff files, mp3 files, FLAC files, .midi files or any other type and form of audio file used in the industry. Media file 300 may be an audio or video streaming file provided by a service in real time, such as a broadcast, or a multicast or a unicast audio, video or an audio/video stream, including a radio stream, internet stream, a television channel stream or a movie stream. Media file 300 may comprise any type and form of a media file discussed herein or used in the media industry. Media file 300 may comprise one or more video tracks 310 and one or more audio tracks 313, any of which may be encoded in any format or compression method described herein.

Video track 310 may comprise any type and form of a video file described herein. Video track 310 may be accompanied by a timeline 309, which may be synchronized to, or shared by, any and all audio tracks 313 of the media file 300 as well as the video tracks 310. In the video track 310, there may be particular items that are to be marked via mkues 303. In such instances, a marker 301A may be disposed in the timeline 309 indicating the exact time when a particular item corresponding to such marker is displayed in the video, while an mkue 303 may also be inserted into the audio track 313, coinciding with the time of the marker 301. This way, mkues 303 may be synchronized with items in the video portion of the media files 300.

An audio track 313 may be any audio channel or audio track representing audible and inaudible audio, or sound, signals stored as a part of a media file 300. Audio track 313 may be a communications channel in a storage device for a multi-track recording whether in an audio only or audio/video file. Audio tracks 313 of a media file 300 may be synchronized in time, and may therefore share, or reference, a timetable. In one example, all audio tracks 313 of a media file 300 are synchronized with each other such that at a particular time their sound recording on all tracks (or audio channels) corresponds to the sounds recorded at that same particular time. As discussed above, audio tracks 313 and video track 310 may share a single timeline, such that all the events in all the video and audio tracks are synchronized. Accordingly, timelines 309 may reference when each particular mkue 303 is inserted into the media file 300, as well as the duration of the mkues 303.

Flag 107N may be any indicator or a "software flag" or setting, indicating a status or condition of an audio track 313 or a media file 300. Flag 107 may be a hardware or a software mark or a preference setting. In some embodiments, flag 107 indicates whether a particular media file 300 is to be compressed or decompressed, encoded or decoded. In other embodiments, flag 107 indicates whether an audio track 313 within a media file 300 is to be compressed or decompressed, encoded or decoded. Flag 107 may comprise a status that a particular audio track 313 is not to be encoded or compressed. For example, flag 107 may identify that a particular audio track 313 that comprises one or more mkues 303 is not to be encoded or compressed in order to avoid damaging or reducing the quality of the one or more mkues 303 inserted into the file. Flag 107 may also comprise a status that a particular portion of an audio track 313 is not to be encoded or compressed. For example, flag 107 may indicate that a portion of the audio track 313 that contains an mkue 303 is not be encoded or compressed, while other portions of the file may be. In an alternative embodiment, flag 107 indicates a condition that portions of an audio track 313 comprising mkues 303 be encoded in a particular way in order to reduce deterioration of the quality of the inaudible signals of the mkues 303, while other portions of the audio track 313 may be encoded differently.

An mkue 303 may be any audio signal that can be detected by a microphone 225 of a mobile device 220. Mkue 303 may comprise a plurality of inaudible signals or a plurality of audible signals or a plurality of inaudible and audible signals. Mkue 303 may comprise any combination of inaudible and audible signals that may be "heard" by a microphone 225 and processed by mkue application 230, to recognize an item or items corresponding to such an mkue 303. An Mkue 303 may be comprise any number of frequencies, which may be made in any configuration. For instance, an mkue 303 may comprise anywhere between two and a thousand separate sound signals whose frequencies may be anywhere between 20 Hz and 40 kHz and provide a unique signature indicative of a particular item (i.e. a product, service, property, etc. . . . ). In some embodiments, mkue 303 comprises 2, 4, 8, 10, 16, 24, 32, 48, 64, 128 or any other number of single frequency signals played simultaneously for a predetermined time period, such that their combination forms a unique signature. In such instances, any signals may overlap with each other in time (e.g., the signals may be played simultaneously). In other embodiments, mkue 303 comprises two or more frequency signals, such that each is played in a particular order, where some signals may overlap, while others do not, thereby forming a unique signature using a combination of different signals and the order in which they are played. In further embodiments, mkue 303 comprises a combination of several multiple-frequency signals. An mkue 303 may include audio signals whose frequencies are above 15 kHz. In some embodiments, mkues 303A-N comprise audio signals in 15 kHz-22 kHz range, or whatever frequency range above the human audible range a mobile device microphone 225 may detect. In some instances, mKue 303 may include audio signals played in 16 kHz-22 kHz range, or 18 kHz-20 kHz range, or 19 kHz-21 kHz range, or any other range that is within the detection frequency range of a microphone 225 of a mobile device 220. An Mkue 303 may comprise several signals that may be played at above 16 kHz and at particular frequencies to indicate a code for a particular item.

Each mkue 303 may have its own unique signature, including unique frequency signal combinations which are specific or unique only to that mkue 303. When plotted in the frequency domain, an mkue 303 may include two or more single frequency components on the frequency axis, which may be of the same or varying magnitudes. In some embodiments, absence of some signal frequencies may be interpreted as a "zero," while presence of some signal frequencies may be interpreted as a "one," thereby enabling the system to interpret the mkues 303 as digital signal values. Similarly, a negative logic may be used in that an absence of a particular frequency signal may be interpreted as a "one," while the presence may be interpreted as a "zero."

Audio Cue Insertion Software 100, or ACIS 100, of the transcoding machine 202 may comprise any software for processing media files 300 operating on transcoding machine 202. ACIS 100 may comprise any functionality for encoding, decoding, compressing, decompressing, converting, editing and otherwise modifying media files 300 as used in the media processing industry. ACIS 100 may be any media processing software discussed herein, including aforementioned AVID Media processing tools by Avid Technology, or any other software for processing of media files.

Loader 16 may comprise any hardware, software, or a combination of hardware and software for loading information or data into memory. Loader 16 may be used for retrieving data, such as media files 300, mkues 303, item information 116 or any other information discussed herein, into a processor to get it prepared for processing. Loader 16 may comprise memory locations, such as registers and cache, along with any functions, circuitry, logic or algorithms for managing such memory related operations. Loader 16 may also include logic and circuitry for loading specific data, such as identifiers, mkues 303, media files 300 or any other digital information discussed herein.

Transcoder 26 may comprise any hardware, software, or a combination of hardware and software for transcoding media files 300. Transcoder 26 may comprise logic, circuitry, processors, codecs, software and hardware components for implementing and facilitating any combination of: media file compression, decompression, encoding, decoding, conversion from one format file to another, editing, filtering and any other editing functionality that may be done to a media file. Transcoder 26 may comprise the functionality for inserting mkues 303 at locations or identifiers in a timeline 309 as indicated in mkue timing 315 files. Transcoder 26 may comprise functions for automating transcoding of media files 300 to include mkues 303 into the media files 300 without any user intervention during the process. Transcoder 26 may comprise the functions, logic and circuitry for inserting mkues 303 into an audio track of a media file 300. Transcoder 26 may comprise any functionality of the transcoding machine 202 described herein, including the ability to encode and convert the media files 300 into any formats discussed herein.

Media player 210 may be any device, or a combination of devices, capable of playing media files 300. Media player 210 may also comprise the functionality for playing the mkues 303 inserted into the audio portion of the media files 300 processed to comprise the mkues 303. Media player 210 may include, but not be limited to: a music player such as a radio, an mp3 player, an audio system, a mobile phone, a tablet or a PC. Media player 210 may also include, without limitation: an LCD, LED or OLED television set, a video projector system, a movie theater system, or any other audio/video playing system. Media player 210 may comprise a sound system for use at, e.g., a concert or a sporting eventvenue. Media player 210 may comprise a sound speaker 215 capable of transmitting audio signals in the audible and inaudible frequency range, including the frequency range of 15-22 kHz in which the inaudible signals may exist.

A sound speaker 215 may be any device converting audio signals into corresponding air vibrations in order to make audible and inaudible signals. A sound speaker 215 may be any type and form of a sound speaker of any media player 210 described herein, or known in the respective industries for any type of media player 210. For example, sound speaker 215 may be a sound speaker of an iPhone or an Android phone, a tablet or an iPad, a laptop or any other mobile device 220.

Mobile device 220 may be any computing device used by a consumer to whom mkues are served. Mobile device 220 may be any computing device capable of communicating over a network, wired or wireless. Mobile device 220 may be a mobile phone, such as an iPhone or an Android phone, a tablet, such as an iPad, a personal computer, a laptop, a processing work station, a notebook, or any other device capable of connecting and communicating via the internet and simultaneously listening for mkues using a microphone 225. Mobile device 220 may comprise hardware, software or a combination of hardware and software, including, but not limited to: processing units for performing operating functions of a computing device discussed herein, memory units for storing information, applications and data, a display or any other means for interfacing with a consumer, an interfacing processor for enabling and establishing network connections and connecting to the internet, as well as any hardware or software for operating a microphone 225, a web browser 235 and mkue application 230.

Microphone 225 may be any instrument capable of converting sound waves into electrical signals, which may then be amplified, processed, transmitted, or recorded. Microphone 225 may comprise any type and form of a microphone known or used in the respective industries of any of the mobile devices 220 discussed herein.

Mkue application 230 may be any hardware, software or a combination of hardware and software operation on a mobile device 220 and facilitating detecting of mkues 303. Mkue application 202 may comprise the functionality for detecting the unique signature of an mkue 303. Mkue application 230 may be an application installed on a mobile phone, tablet or a personal computer. In some embodiments, mkue application 230 is a web application running on a remote server, but interfacing with the consumer's mobile device 220 and/or running an agent program on the consumer's mobile device 220 in order to provide service to consumer's mobile device 220. Mkue application 230 may comprise the functionality for monitoring signals received by a microphone 225 and reconstructing mkue 303 from the signal stream monitored. Mkue application 230 may comprise the functionality for identifying frequencies and amplitudes of particular components of an mkue 303. For example, mkue application 230 may monitor inaudible frequency range, such as, for example, 16 kHz-22 kHz range in order to detect mkues 303. In some embodiments, mkue application 230 may run a function or a program for identifying, in the frequency domain, particular frequencies of a particular mkue 303 within the inaudible frequency range of above 15 kHz. For example, mkue application 230 may monitor a particular frequency range, such as for instance 18-20 kHz for mkues 303. Similarly, mkue application 230 may monitor any frequency range or series of ranges, between 15 kHz and whatever the highest detectable frequency of the microphone 215 may be. Mkue application 230 may then convert the detected signal frequencies of the mkue 303 into a code which then may be used to identify the particular mkue 303 received. In some embodiments, mkue application 230 identifies the particular mkue 303 locally on the mobile device 220, using functionality of a mkues API 255 and mkues database 260 that may be locally stored. In other embodiments, mkue application 230 identifies the particular mkue 303 in collaboration with the mkues database 260 and mkues API 255 on a remote content distribution server 250.

Mkue application 230 may transmit a request, also referred to as an mkues 303 request, which may comprise information about mkue 303 detected to a content distribution server 250 to request from the server help in determining to which item the mkue 303 corresponds. The mkues 303 request may comprise any number of features about the mkue 303. The mkues 303 request may include the information about the particular frequencies of the signals included in the particular mkue 303, based on which a match in the Mkues database 260 may be found in order to identify thte item to which the mkue 303 corresponds. The mkues 303 request may include digital representations of the frequency signals as well as the representations of the signals that were not found. For example, mkues 303 request may include digital representations of the frequency signals present in the detected mkue 303, as identified by the mkue application 230. Based on these digital representations of the mkue 303, the Mkues API 255 of the content distribution server 250 may utilize the mkues database 260 to identify the item corresponding to the given mkue 303. Alternatively, mkue 303 request, may include any other information about the mkue 303, including information on various frequencies of signals of the mkue 303, magnitudes of those frequencies, time durations of the signals, order in which the signals were played, and so on. In short, mkue 303 request may include any signature that may be used to identify the unique mkue 303 received by mobile device 220.

Content distribution server 250 may be any type and form of server capable of sending and receiving requests over a network. Content distribution server 250 may be a single server, a server farm of several servers or a service on a cloud operating as a server for multitude of consumers. In some embodiments, content distribution server 250 is a server servicing thousands of consumers, receiving their requests, such as mkues 303 in any encoding, and providing responses responsive to such requests. Content distribution server 250 may comprise the functionality to receive, process and respond to TCP/IP requests for web pages or any other service that consumers may request over the internet. Content distribution server 250 may comprise the necessary hardware, software or a combination of hardware and software to provide services to clients over the network, as well as run mkues API 255, mkues database 260, access mkue tags 270 and respond to any consumer request comprising mkues 303.

Mkues API 255 may be any application communicating with mobile device 220 and processing mkue 303 requests. Mkues API 255 may comprise any hardware, software, or a combination of hardware and software for processing mkues 303 requests. Mkues API 255 may include functions that receive mkue 303 requests and distinguish these requests from other requests. Mkues API 255 may comprise the functionality to extract from the mkue 303A request information needed to identify the item corresponding to the received mkue 303. Mkues API 255 may interface with, and utilize mkues database 260. Mkues API 255 may include the functionality for reading information from, as well as making new entries into, Mkues database 260.

Mkues database 260 may comprise any structured set of data pertaining to a large number of various mkues 303. Mkues database 260 may include any information relating to items (i.e. events, products, services, people, and more) associated with mkues 303 as well as mkues 303 themselves. Mkues database 260 may include information needed for matching an mkue 303 to a particular item. Mkues database 260 may comprise the functionality to provide information on a particular item, based on the received mkue 303 request associated with that item. Mkues database 260 may comprise the logic or functionality for performing a search in a database to find an mkue tag 270 whose mkue 303 matches the mkue 303 information from the mkue 303 request from a mobile device 220. For instance, mkues database 260 may include the information on each individual unique mkue 303 in a collection of mkue tags 270 for identifying each individual item (i.e. a product, an event, a person, a service) corresponding to the particular mkue 303. Upon receiving a signature reconstructed by mkue application 230 on a mobile device 220, mkue database 260 may search and find a matching mkue 303 in the database 260. Once the match is found, either by database 260 management system or by mkues API 255, other information related to the matched mkue 303 and its corresponding item may be retrieved from the matching mkue tag 270.

Mkue tag 270 may include any collection of data or information pertaining to a particular mkue 303 and the item to which the mkue 303 corresponds. In some embodiments, mkue tag 270 is a database structure comprising a number of variables, links, values, descriptions, or other information about an item provided by a company or a corporation or any other marketable feature or thing. Mkue tag 270 may also include mkue 303. In some embodiments, mkue tag 270 includes information on a particular mkue 303. In some embodiments, mkue tag 270 comprises frequencies and/or amplitudes of inaudible signals that are unique to a particular mkue 303. Mkue tag 270 may include information on uniquely identifying or distinguishing a particular mkue 303 from others, including representations of inaudible signals in frequency or time domains.

Item information 116A, also referred to as the item info 116A or item data 116A, may comprise any time and form of information on the item which the mkue 303 identifies. Item info 116A may therefore include any type and form of information on any product, service, event, person, animal, place, property or any other thing that may have a commercial value to potential consumers or clients. Item info 116A may comprise a web page, a flyer, a presentation file, a video file, an audio file, a video or an audio advertisement, a link to a website, a list of search results on a particular item, or any other information that may be presented to a consumer via a mobile device 220. Item info 116A may include a price of an item, a location of an item, a unique identifier of an item, such as a unique product ID, an address of an item, description of an item, make and model of an item, store locations where the item could be purchased, online addresses for purchasing the item, instructions on how to activate a service, information on the service provider, information on the person of interest, information on movies or music by an artist, information on any feature which the consumer may be interested in buying, seeing or using. In short, item information 116A may include any data on the item, including item webpage 114A, which may be any online presentation of the item corresponding to an mkue 303, an internet web page, or a hyperlink to a webpage, which when then sent to the consumer's mobile device 220 opens a webpage of the item corresponding to the mkue 303. Item info 116A's webpage 114A may include a picture of the item, links to other information relating to the item, information on stores where the item may be purchased, instructions on buying the item via an internet webpage, or any other information presented to the consumer, who may potnetnially buy the item.

In some embodiments, item information 116A may comprise an indicator that the mkue 303 corresponding to the item information 116A corresponds to a group of mkues of a particular event. Item information 116A may also identify all the other mkues 303 of that same event. The mkues of a particular event may be mkues 303 that are provided in bulk to the end consumer because they all occur within a single media file 300, or may be played or emitted within a single event. As such, when the mkue system determines that one of these mkues 303 from the particular event are requested by an end-consumer, the system may use a push notification server 900 (to be discussed later below) to provide all the mkues 303A-N associated with this same event even before the consumer asks for them, because the consumer's request for one of them is a sufficient indication that the consumer will ask for the remaining ones shortly. Providing these mkues 303 in advance improves the service and ensures that the end-consumer is serviced on time.

In one embodiment, the received mkue 303 request is matched to an item information 116A, also referred to as item data 116A, and other associated files or services, such as a webpage 114A for the particular identified item corresponding to the particular mkue 303. The web page 114 of the item identified by the mkue 303 request may then be sent to the consumer's mobile device 220 and be used as a presentation of the item to the consumer. Mkues database 260 may therefore enable the content distribution server 250 to recognize the item, or items, uniquely identified by the mkue 303 played from the media player 210. Once a particular mkue tag 270A having a particular mkue 303 is identified as matching the mkue request, the corresponding item information 116A or item webpage 114A may be sent back to the consumer's mobile device 220 where it can be displayed to the consumer via web browser 235 of the mobile device 220, in real time, all the while the consumer is still watching the scene that just a fraction of a second ago had generated the mkue 303.

Figure 5:
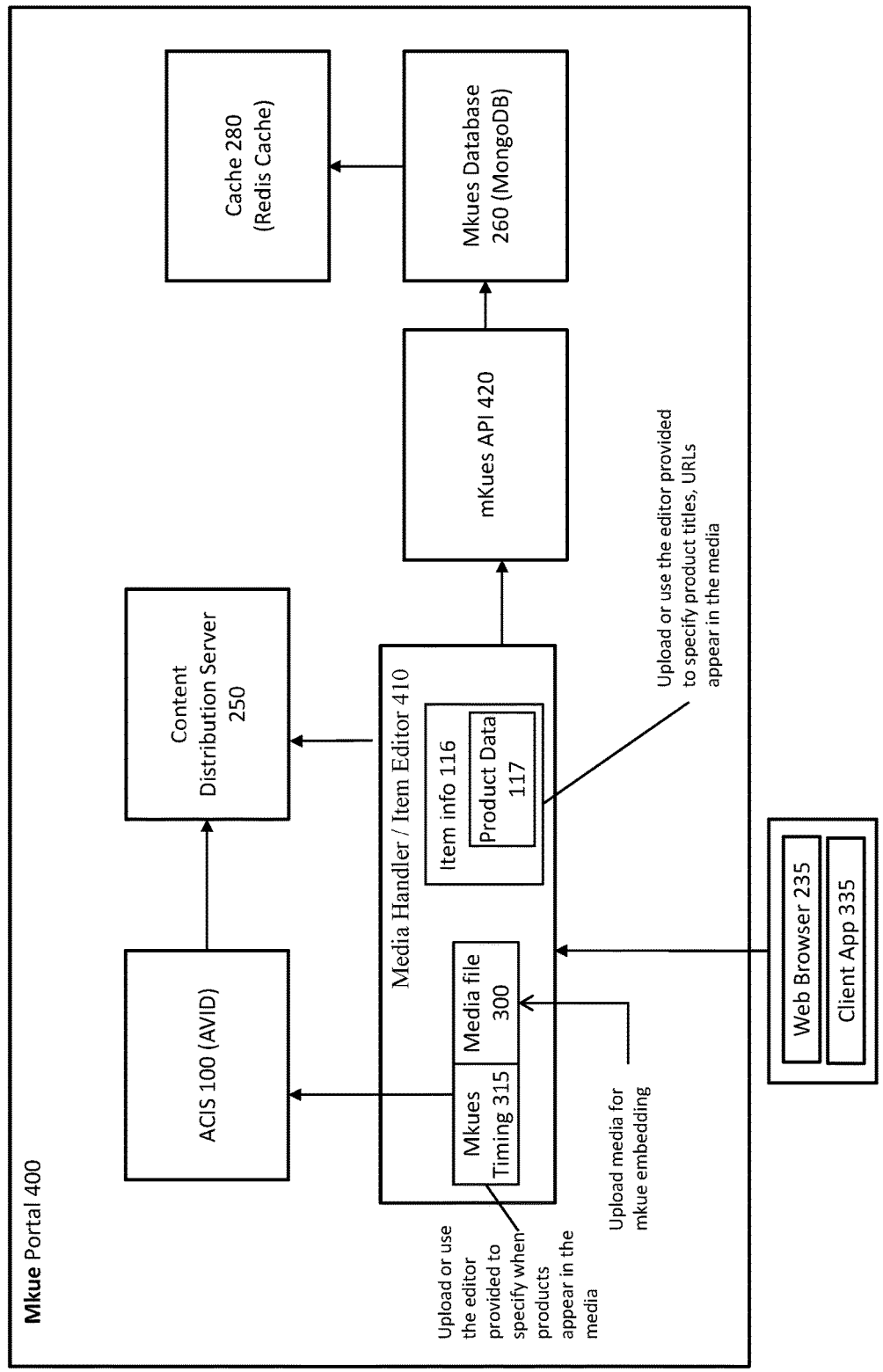
FIG. 5 illustrates a block diagram of an exemplary architecture for an mkue portal for transcoding media files to insert inaudible cues (mkues) and provide the mkue services to consumers.

Referring now to FIG. 5, an embodiment of an architecture for creation and operation of a mobile platform as a service that provides a stage for creation and distribution of media files 300 with embedded inaudible audio cues is illustrated. In a brief overview, the illustrated embodiment of the system includes a version of mkue portal 400 implemented using cloud-based technology. Mkue portal 400 may interface with a computing device, such as a client device 320 that includes a web browser 235 and/or client application 335, also referred to as the client app 335, that is connected to the mkue service provided by the cloud-based Mkue portal 400. The Mkue portal 400 may provide the functionality for enabling the clients or customers, such as the providers of the media content comprising mkues 303, to create, manage and coordinate the audio alert mkue 303 signals, as well as the items or products that such mkues 303 identify. The client may connect to the mkue portal 400 via web browser 235 of client device 320 or via the client app 335. Client app 335 may work in conjunction with mkue portal 400 to generate, manage, store, insert and process the mkue 303 for the corresponding items. Mkue portal 400 may comprise an ACIS 100, a content distribution server 250, a cache 280, a mkues database 260, mkues API 420 and media handler/item editor 410, which may further include mkue timing 315, media files 300 and item info 116 that may comprise product data 117. Mkue portal 400 may provide the clients, who provide mkue-processed content to the end-consumers, with the functionality that can enable the clients to log on and register onto client profiles on the mkue portal 400 along with the tools for processing and inserting mkues 303 into media content. The clients may be provided with the functionality to manage their accounts, generate mkues, upload media, specify mkue product information as well as the media files, and specify how mkues are responded to by the system. The mkues portal 400 may also provide the functionality to enable the clients (i.e. the content providers) to upload raw media files, and make their own mkue processed media files 300, insert mkues into the media files, insert and manage the item info 116, and also manage the timing of occurrence of mkues 303 inside the media files 300.

In a greater detail, a client device 320 may comprise any type and form of a computing device used by a client providing mkue processed media content to the end-consumers via an Mkue portal 400. In some embodiments, client device 320 may be a computing device that the client operates to provide the media content via a transcoding machine 202. Client device 320 may comprise any functionality of a mobile device 220. Client device 320 may therefore be a mobile device, a smart phone, a tablet, a personal computer, a laptop, a computing work station or any other device that may communicate via a network to an internet website or an online service, such as mkue portal 400. Client device 320 may comprise a web browser 235 and a client application 335.

Client application 335, also referred to as a client app 335, may be any software program enabling clients to generate, manage, store, insert and process mkues 303 into media files 300. Client application 335 can comprise hardware, software, or a combination of hardware and software. Client application 335 may comprise the functionality for creating and processing mkues 303, populating mkues database 260, associating mkues 303 with their corresponding items (i.e. products, persons, services and similar), and enabling communication between client device 320 and mkue portal 400 and various functionalities or services provided by the mkue portal 400. Client application 335 may operate on any platform including Android or Apple iOS platforms, as well as Microsoft Windows, Apple OS or any other similar operating system. Client application 335 may comprise the functionality for generating mkue tags 270 in a mkues database 260. Accordingly, client application 335 may comprise the functionality to operate, control or use features of the content distribution server 250 in order to manage and control the mkue-processed content. Client application 335 may comprise the functions and/or algorithms for generating a new and unique mkue 303 for a new item. Client application 335 may also comprise the functions and/or algorithms that generate item info 116A and item webpage 114A for each new item or items. The functions or algorithms of the client application 335 may comprise the functionality to issue commands to the transcoding machine 202 and/or content distribution server 250 to use their functionalities to implement the actual generation of the new mkues 303 and/or corresponding item info 116 and item webpages 114.

Media Handler/item editor 410, may comprise any hardware, software or a combination of hardware and software for handling media files and enabling the clients to insert mkues 303 into the media files 300. Item editor 410, also referred to as media handler 410, may comprise algorithms, executables, hardware and/or software features for generating, encoding and processing mkues 303 and/or media files 300. Item editor 410 may comprise any of the functionality of ACIS 100, including the functionality for retrieving and storing, modifying, encoding, decoding, compressing and decompressing media files 300. Item editor 410 may comprise the functionality for specifying at time location 304, or a identifier 304, of the timeline 309 of the media file 300, an mkue 303 is to be played. For example, item editor 410 may comprise the functionality to associate mkues 303A-N with their corresponding identifiers 304A-N in order to ensure that each mkue 303 is inserted at the identifiers 304 of the timeline 309. Item editor 410 may receive the identifiers 304 from an mkue timing 315. Item editor 410 may receive the mkues 303A-N to be inserted at the corresponding identifiers 304A-N from client device 320 directly, via a file that enumerates or includes all of the mkues 303A-N to be inserted. Item editor 410 may comprise item info 116, which may also be used to identify the mkues 303 to be inserted. Inside the item info 116, item editor 410 may further include specific product data 117 that might include any data or information on the product to which the mkue 303 might correspond. Item editor 410 may comprise the functionality for communicating with, or interfacing with, ACIS 100, content distribution server 250 and mkue API 420. Accordingly, item editor 410 may have at its disposal all of the functionality of the ACIS 100, content distribution server 250 and mkue API 420, as needed, in order to implement its functionality and tasks.

Mkue timing 315 may comprise any information on a particular mkue 303 or mkues 303A-N to be inserted into a media file 3000 and/or on the timing on the timeline 309 of the media file 300 at which the particular mkue 303 or mkues 303A-N will appear in the media file 300. In some embodiments, mkue timing 315 comprises information on a particular mkue 303 for a particular item or product to be inserted into the media file 300. In some embodiments, mkue timing 315 comprises information on the location or locations within the timeline 309 at which the mkue 303 or mkues 303A-N are to be embedded. A location in the timeline 309 at which an mkue 303 may be inserted may also be referred to as an identifier 304, or a time code location 304. At this location 304 within the timeline 309, the embedded mkue or mkues 303 will be played as the media file 100 is played. The timeline 309 location 304, or locations 304A-N, of the inserted mkues 303 may be synchronized with the moment in the media file 300 when a particular item appears, is shown or is mentioned or discussed. Mkue timing file 315 may also include information on an mkue 303 to be inserted as well as the identifier for timeline location at which that mkue 303 will be inserted. As such, for example, when a particular watch is zoomed on, or otherwise featured, by a video component of a media file 300, the mkue 303 for that watch may be inserted at the time code location 304 when the watch is being featured on the video, in order to be presented to the consumer at the same time as the video portion with the watch zoomed-in is being played.

Product data 117 may comprise any data or information on items relating to products that are offered for sale. Since an item may include any type of service, place, real property, person, in the instances in which the item corresponds to a product, such as a watch, for example, product data 117 may include any type and form of information on that product. In some embodiments, product data 117, as with any other item info of a similar product-like item, comprises any one or more of: a product ID number, product model and serial numbers, universal product code, electronic product code, motion picture production code, product key for a software, a barcode, part number or any other type and form of unique identifier of a product. Product data 117 may also include links to websites where the product may be purchased, results of a search engine search for the product information, store locations for the product, services available for the product, product features, specifications and descriptions, as well as any other marketing information for a product.

Mkues API 420 may comprise any set of routines, protocols and tools for software applications or programs concerning mkues 303 and/or media files 300. Mkues API 420, may also be referred to as the Mkues application program interface 420, and may comprise software components that may interact with other software and/or hardware functions. Mkues API 420 may comprise any functionality, logic, functions or circuitry of mkue API 255 of the content distribution server 250, and vice versa. Mkues API 420 may include the functionality for taking media files 300 edited to include mkues 303 and storing them into mkues database 260. Mkues database 260 may work in conjunction with the mkues API 420 to generate new mkue tags 270 for each new mkue 303 generated or created. Moreover, in some embodiments, mkue tags 270 are generated in conjunction with the creation of the mkues 303. Item editor 410 may work together with the mkues database 260 using the mkues API 420 to have the mkues API 420 coordinate or enable the generation of the new mkue tags 270, along with the new mkues 303, for the usage by the item editor 410 in processing of the media files 300 to insert the newly generated mkues 303 within them.

Mkues database 260 may comprise any of the aforementioned embodiments. In addition, mkue database 260 may include a cross-platform document-oriented database, such as a database similar to the Java Script Object Notation (JSON) documents. In one embodiment, the mkues database 260 is a Mongo DB database, by MongoDB Inc. In other embodiments, it may be any other database used in the industry for the related types of applications.

Cache 280 may be any online computing device acting as a server for mkues-related network content described herein. Cache 280 may be a server, such as a Redis cache or data structure server. In some embodiments, cache 280 is any other type of server. In some embodiments, cache 280 is an online computing server for serving web pages and other information relating to items identified by mkues 303. In some embodiments, cache 280 is a server responding to mkue 303 requests from end-consumers. In further embodiments, cache 280 is a content distribution server 250 and comprises all the functionality of a content distribution server 250. Cache 280 may temporarily store the content most commonly accessed and provide such content upon requests at a faster rate than if the content were retrieved from a permanently stored location. Cache 280 may therefore be tailored to servicing mkue-related content at the most optimal rates.

Figure 6:
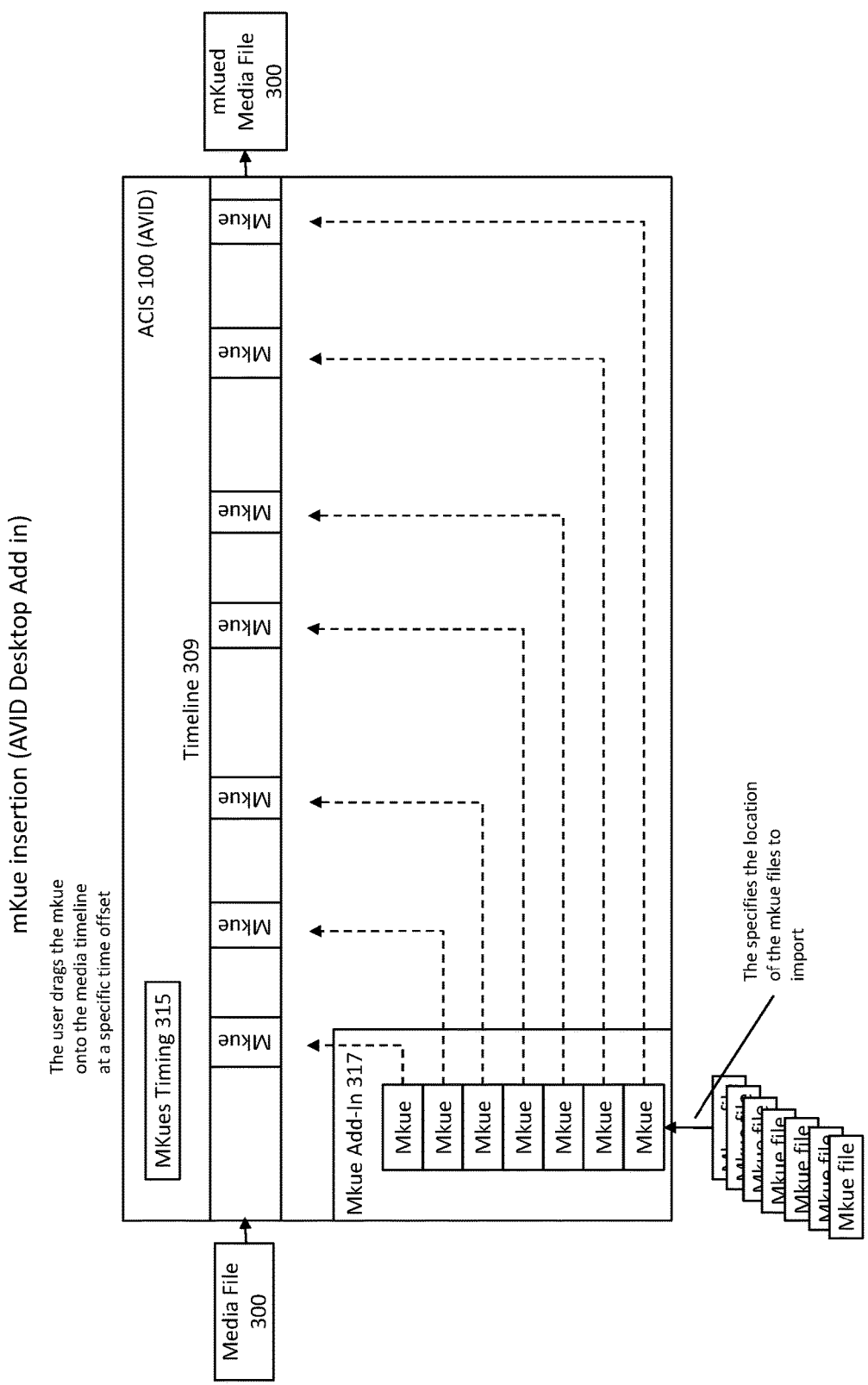
FIG. 6 illustrates a diagram of an exemplary media file processed to include mkues at particular locations on the timeline of the media file.

Referring now to FIG. 6, an embodiment of a technique for inserting mkues 303 into a media file 300R is illustrated. In a brief overview, a raw media file 300R is retrieved by ACIS 100 for processing. ACIS 100 may include a media file 300R with a timeline 309 and Mkue Add-in 317 function. Mkue Add-in 317 function may comprise, or be in communication with, any number of mkues 303 to be inserted into the media file 300. Mkues 303 may be inserted into the media file 300R manually by a user of ACIS 100, such that the mkues 303 are inserted into the timeline 309 any way the user prefers to do so. However, in some embodiments, mkues 303 are inserted into media file 300R in an automated fashion using mkues timing 315. Mkues timing 315 may comprise the timing information for identifying where in the timeline 309 each of the mkues 303 from the mkue Add-in 317 are to be inserted.

In a brief overview, Mkue Add-in 317 may comprise any hardware, software or a combination of hardware and software for inserting mkues 303 into media files 300. Mkue Add-In 317 may also include any information on mkues 303A-N to be inserted into a media file 300R. Mkue add-in 317 may comprise a list of mkues 303A-N to be inserted into a media file 300R, identifications of the mkues 303A-N to be inserted into the media file 300R, or the mkues 303A-N themselves. Mkue Add-In 317 may comprise software algorithms, executable and functions operating in conjunction with the hardware components to enable the user to manually insert mkues 303 into media files 300. In some embodiments, mkue add-in 317 comprises functionality for automated insertion of mkues 303 into media files using mkues 303 included in, or identified by, mkue add-in 317 and mkues timing 315. Mkue add-in 317 may comprise the functionality to identify an mkue 303 and identify its corresponding identifier 304 in the mkues timing 315. Mkue add-in 317 may also comprise the functionality to insert the identified mkue 303 at the identified identifier 304 of the timeline 309 in response to identifying both mkue 303 and its corresponding identifier 304. Accordingly, mkue add-in 317 may include the functionality to receive as inputs a set of mkues 303A-N and a set of identifiers 304A-N for those mkues 303A-N, and associate each of the mkues 303A-N with their corresponding identifiers 304A-N. In some embodiments, mkue add-in 317 includes the functionality to insert all of the mkues 303 at their corresponding identifiers 304, thereby processing the raw media file 300 into mkues processed media file 300. In other embodiments, mkue add-in 317 includes the functionality to work in conjunction with transcoding machine 202 components and/or item editor 410 to insert the mkues 303 at their corresponding identifiers 304.

Figure 7:
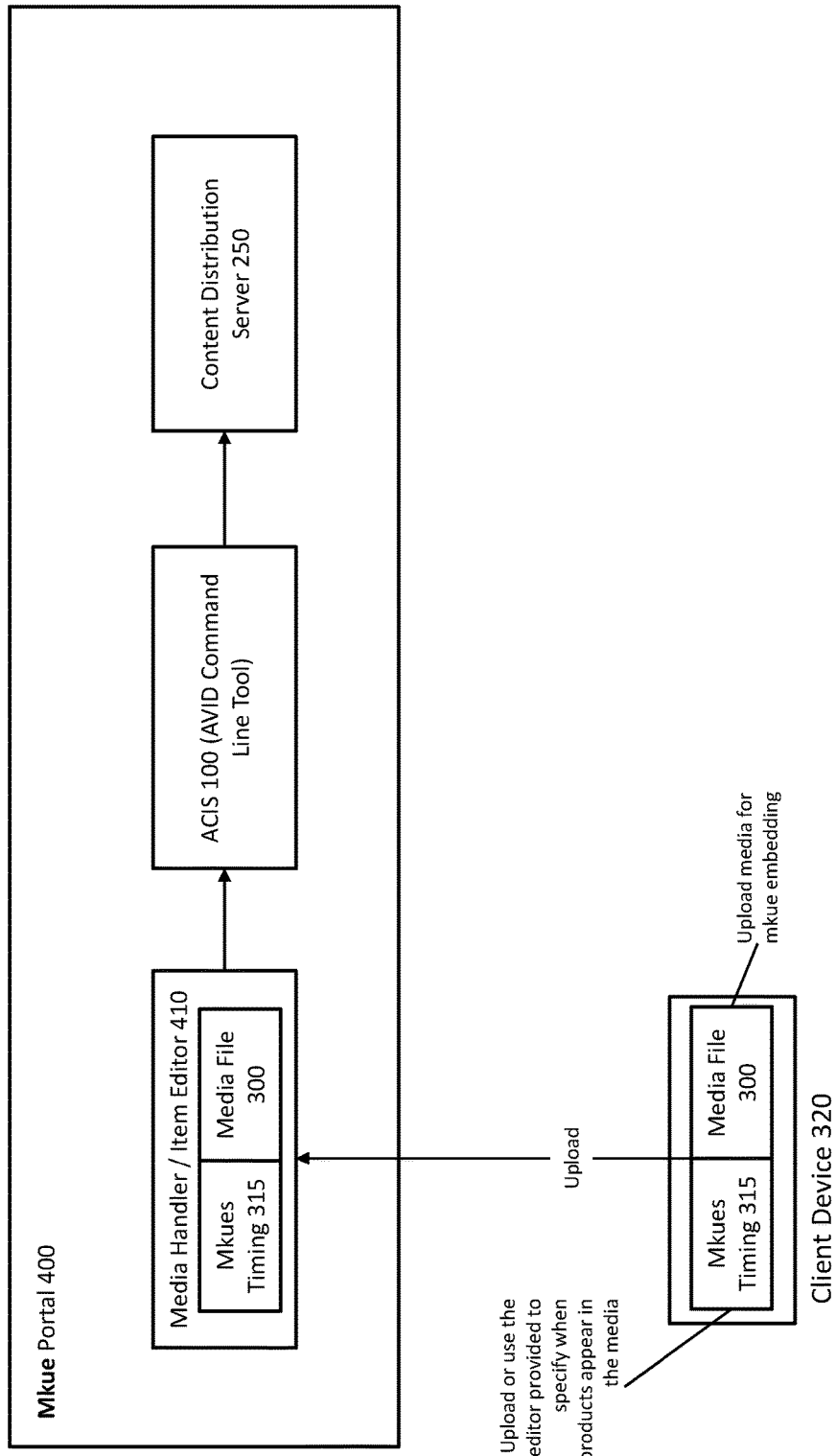
FIG. 7 illustrates another embodiment of an mkue portal for transcoding media files and providing mkue services to consumers.

Referring now to FIG. 7, an embodiment of mkue portal 400 is illustrated. In brief overview, FIG. 7 shows an mkue portal 400 receiving mkues timing 315 file along with the media file 300 from the remote client device 320. Media handler/item editor 410 receives the mkues timing 315 file and media file 300 from the client device 320. Media handler/item editor 410 may then forward the relevant contents from the mkues timing 315 file and media file 300 to the ACIS 100 so that ACIS 100 functions would process the media file 300 so as to insert the mkues 303 into the media file 300 at identifiers indicated by mkues timing 315. Upon processing of the media file 300, ACIS 100 sends the mkues processed media file 300 to the content distribution server 250, from which the media file 300 can be distributed to the end-consumers.

In more detail, FIG. 7 relates to an architecture and methodology in which clients upload a raw media file 300R and associated mkue timing 315 file to the portal. The raw media file 300R may be a video file, such as a blockbuster movie, a video commercial or an audio file of a song or a concert. The mkue timing 315 file may comprise information on indentifiers on the timeline 309 at which mkues 303A-N will be inserted. In some embodiments, mkue timing 315 includes mkues 303 to be inserted and/or information on the mkues 303 to be inserted. The mkue portal 400 may then, via media handler/item editor 410, interface with and use ACIS 100's functionality, such as for example the AVID media processing software's command line utility, to add mkues 303A-N into the media file 300 at the time locations or identifiers specified in the timing file 315. The resulting mkue processed file 300 may be deployed to a distribution server 250 for delivery to the consumer.

Referring now to FIG. 8, an embodiment of an architecture of mkue portal 400 for providing a sequential mkue service to end consumers is illustrated. In a brief overview, a media player 210, such as a TV or a radio, plays media content 300 that includes inserted inaudible mkues 303. Consumer's mobile device 220 intercepts an mkue 303 from the media file 300 via its microphone 225. Mobile device 220 then sends to the mkue portal 400 an mkue request that may include mkue 303 information needed to identify the item of the mkue 303. Mkues API 420 may receive the request and utilize the aforementioned functionality to process the request. Depending on the configuration, Mkues API 420 may interface with, and/or utilize, any functionality discussed in connection with FIG. 4 to respond to the request. Cache 280 may receive the content relating to the mkue request from the mkues API 420 and distribute it to the requesting consumer. The consumer of the mobile device 220 may then receive the information on the item information 116, item webpage 114 or any other information pertaining to the item identified by this particular mkue 303.

Figure 9A:
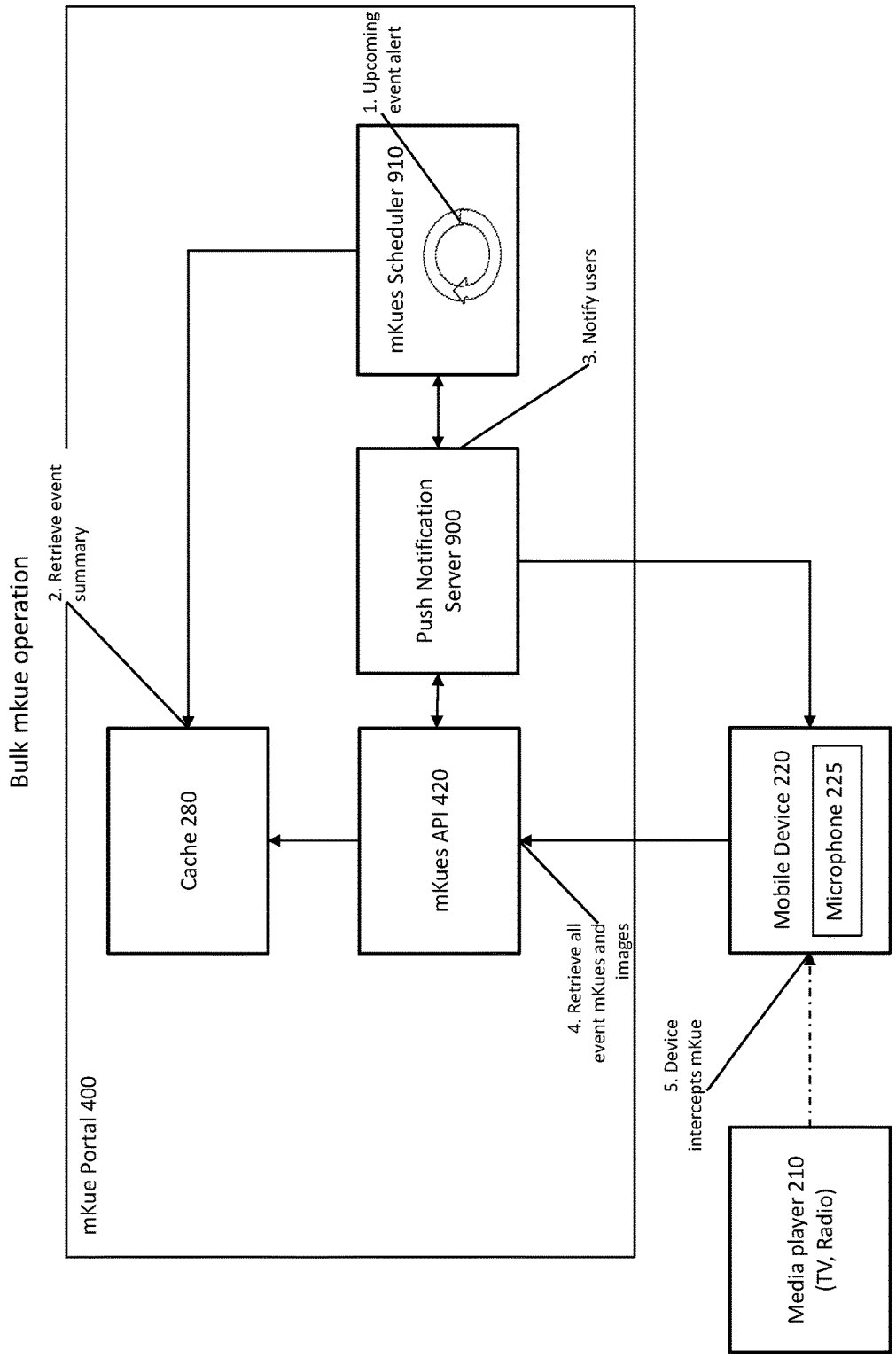
FIG. 9A illustrates a block diagram of an exemplary system for providing mkue services to consumers in bulk using push technology.

Referring now to FIG. 9, an embodiment of an architecture of mkue portal 400 for providing a bulk mkue service to end consumers is illustrated. The bulk mkue service or operation may help improve the consumer experience by preloading mkues 303, media file 300 and item information 116 based on a scheduled upcoming event. For example, Mkue API 420 may track a schedule of client events and notify devices 220 prior to the event with respect to the mkues 303 that are coming up, thereby allowing each device to preload the item information 116 with respect to the particular event to make the individual consumer experience more predictable and consistent.

In a brief overview, just as with the sequential embodiment in FIG. 8 above, a media player 210, such as a TV or a radio, plays media content 300 that includes inserted inaudible mkues 303, while the consumer's mobile device 220 intercepts an mkue 303 from the media file 300 via its microphone 225. Just as with the embodiment in FIG. 8 above, the mobile device 220 may send to the mkue API 420 of the mkue portal 400, an mkue request that may include mkue 303 information needed to identify the item of the mkue 303. However, unlike in the sequential mkue service described earlier, in this instance, the mkue portal 400 allows the consumers to preload the item information 116, item webpages 114 and all other information pertaining to mkues 303 that the consumer will be receiving at a later time. This is enabled by the mkue portal 400 having a push notification server 900 in connection with Mkues scheduler 910 and a cache 280.

Push notification server 900 may be any server or service for preloading mkue-related information to the consumers. Push notification server 900 may include any computing device capable of communication via a network. Push notification server 900 may comprise any functionality of a cache 280 and/or content distribution server 250. In addition, push notification server 900 may comprise the functionality for initiating requests on behalf of a consumer, as opposed to waiting for the consumer's request. This may be accomplished based on information that the push notification server 900 may have with respect to the end-consumer preferences, or scheduled events. As such, for example, push notification server 900 may comprise the functionality to recognize that a particular action by the consumer's device 220, or a particular request from the consumer's device 220, is unique to a particular event that the consumer is undergoing or is about to undergo. For example, push notification server 900 may comprise a logic or a function for determining that a particular mkue 303 which the consumer has just requested is unique to a particular movie that includes a total of fifteen mkues for fifteen particular items. In response to this determination, push notification server 900 may deliver to the cache 280, and ultimately to the mobile device 220, not just the item information 116 of the requested mkue 303 but all fifteen item information 116 of all fifteen mkues 303. Similarly, push notification server 900 may comprise the functionality for determining that the consumer is attending a particular concert in which twenty mkues for twenty items will be distributed to the consumer. In response to receiving the first mkue 303 that is unique to this concert, the push notification server 900 may deliver to the cache 280 and ultimately to the mobile device 220, all twenty item information 116 and their corresponding item webpages 114 in response to receiving the first mkue 303.

Mkues scheduler 910 may comprise any hardware, software or a combination of hardware and software for scheduling delivery of mkue related information to the end consumers. Accordingly, mkues scheduler 910 may comprise the functionality for scheduling delivery of all of the item information 116 and item webpages 114 of a particular event in response to determining that the consumer is undergoing or is going to attend the particular event. Mkues scheduler 910 may comprise the functionality to control which of the item information 116 pertaining to a particular mkue 303 associated with a scheduled consumer event the mkue portal 400 is going to provide first, which one second, and so on. Mkues scheduler 910 may include the functionality for delivery all of the item information 116 to the mobile device 220 at once, or spread out over time. Mkues scheduler 910 may work in conjunction with push notification server 900 and cache 280 to deliver the content to the end user in a timely fashion, as needed.

Figure 9B:
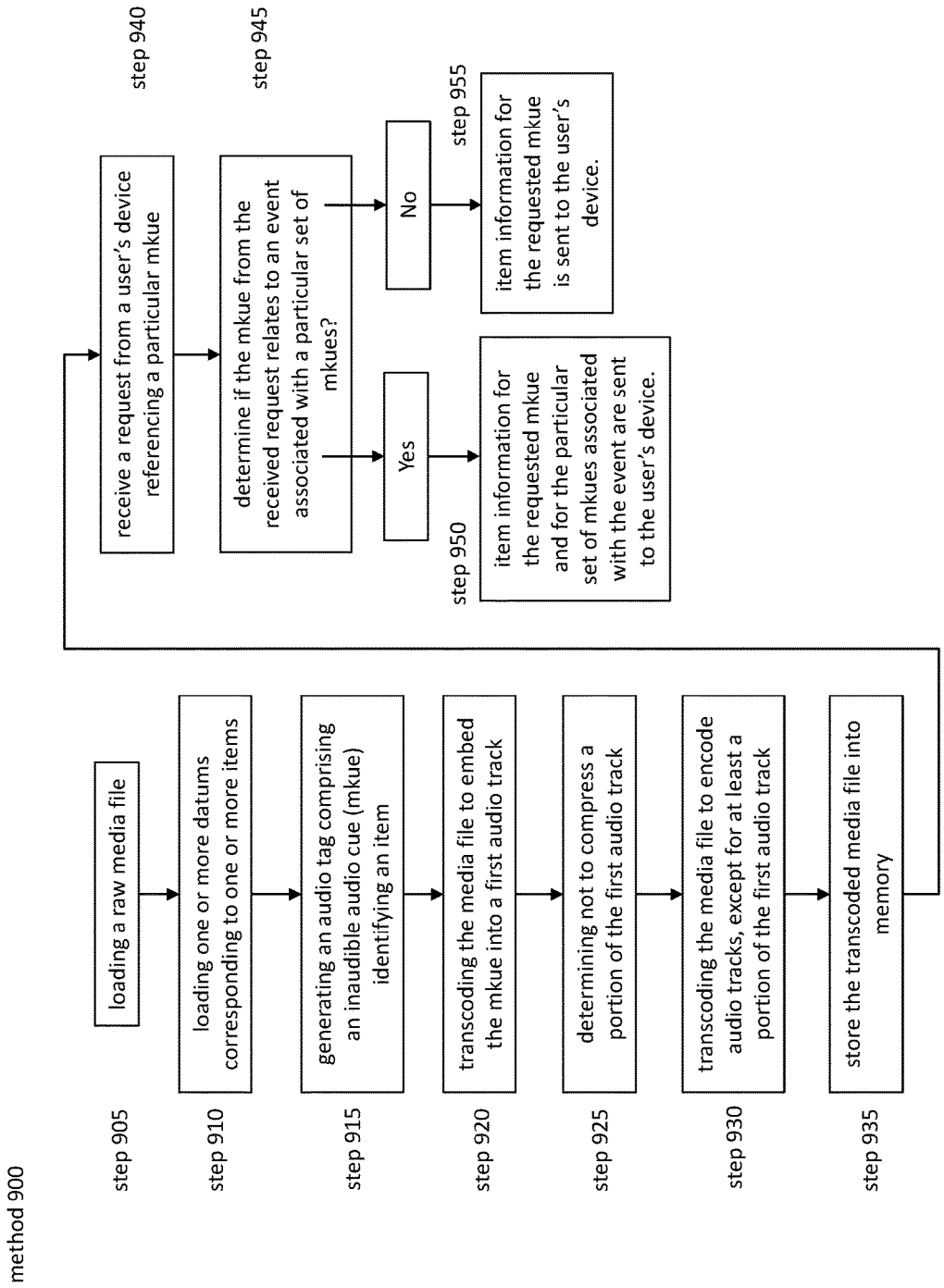
FIG. 9B illustrates a flowchart of an exemplary method for transcoding media files to insert inaudible cues (mkues) and provide the mkue processed media content to consumer devices.

Referring now to FIG. 9B, an embodiment of a method 900 for preparation and distribution of mkue processed media content is illustrated. In a brief overview, at step 905 a raw media file 300 is loaded into a memory for processing. At step 910, one or more identifier corresponding to one or more items is loaded into a memory for processing. At step 915, an audio tag comprising an inaudible audio cue (mkue) identifying an item is generated. At step 920, the raw media file is transcoded to embed the mkue into a first audio track of the media file. At step 925, a determination is made not to compress at least a portion of the first audio track of the media file. At step 930 media file is transcoded to encode one or more audio tracks of the media file, except for at least a portion of the first audio track that is not to be encoded. At step 935, a transcoded media file is stored into a memory location. At step 940, a request from a consumer device referencing a particular mkue is received. At step 945, a determination is made whether or not the received mkue relates to an event associated with a particular set of mkues corresponding to the event. At step 950, if the determination at step 945 is affirmative, then item information 116 for the requested mkue as well as item information 116 for each of the particular set of mkues associated with the event are sent to the consumer's device. At step 955, if the determination at step 945 is negative, then item information 116 for the requested mkue is sent to the consumer's device.

At step 905, a raw media file 300 is loaded into a memory of the transcoding machine 202. Raw media file 300 may be any one of a: video file of a blockbuster movie, a video commercial, a sporting event, a concert, an educational program, a television show, as well as a song, an audio commercial, an audio file, a radio show or any type and form of an digital media file discussed herein. Media file 300 may be loaded into a memory of a transcoding machine 202, or a virtual machine on any server discussed herein or on any device providing an mkue cloud system, such as that of a mkue portal 400. Media file 300 may be loaded into a memory register of a processor for transcoding the media file 300, a memory of a GPU, or any type and form of memory discussed herein.

At step 910, one or more identifier corresponding to one or more items are loaded into a memory. The one or more identifier may correspond to the time code locations on a timeline 309 of a media file 300. The one or more identifier may be provided individually or in a mkues timing 315 file that includes identifier and their corresponding mkues 303 to be inserted into the media file 300. In some embodiments, a transcoding machine 202 loads the one or more identifier. In other embodiments, virtual machines providing cloud-based mkue portal 400 load the one or more identifier. As with media file 300 at step 905, one or more identifier may be loaded into a memory of a transcoding machine 202, or a virtual machine on any server discussed herein or on any device providing an mkue cloud system, such as that of a mkue portal 400. Identifiers may be loaded into a memory register of a processor for transcoding the media file 300, a memory of a GPU, or any type and form of memory discussed herein.

At step 915, an audio tag comprising an inaudible audio cue (mkue) identifying an item is generated in a mkues database 260. In some embodiments, mkues database 260 generates an mkue tag 270 comprising, or referencing, an inaudible audio mkue 303. Generated mkue tag 270, or an audio tag, may comprise a new mkue 303 along with a new item information 116 that may include item webpage 114. Mkues database 260 may generate an audio tag, or an mkue tag 270, in response to determining that an mkue tag 270 for a particular item, or referencing a particular item, does not yet exist. In some embodiments, mkues database 260 generates an mkue tag 270 responsive to determining that an mkue tag 270 for a particular mkue 303, or referencing a particular mkue 303, does not yet exist.

At step 920, transcoder 26 may transcode the media file 300 to embed or insert the mkue 303 into a first audio track 313. Transcoder 26 may insert mkues 303 into a first audio track 313A. Transcoder 26 may insert mkues 303 into the first audio track 313A in response to identifying that the first audio track has a flag 107. The mkue 303 may be inserted at a particular time location in timeline 309 of the media file 300 that is indicated by one of the identifiers corresponding to the mkue. In some embodiments, transcoder 26 inserts the mkue 303 into a particular location on a timeline 309 indicated by an identifier from an mkue timing 315 file that corresponds to this particular mkue 303. In some embodiments, transcoder 26 inserts mkue 303 into a particular first audio track 313A out of a plurality of tracks 313A-N. In other embodiments, transcoder 26 inserts mkues 303 into a plurality of audio tracks 313A-N. Transcoder 26 may embed or insert the mkue 303 into the first audio track responsive to information inside the mkues timing 315 file.

At step 925, transcoder 26 determines not to encode, or compress, at least a portion of the first audio track 313. Transcoder 26 may make this determination responsive to flag 107 indicating that the first audio track 313 is not to be compressed. In some embodiments, flag 107 indicates to the transcoder 26 that the first audio track is not to be compressed or encoded, while in other embodiments, flag 107 indicates to the transcoder 26 that a portion of the first audio track comprising the inserted mkue 303 is not to be compressed or encoded. In further embodiments, flag 107 identifies to the transcoder 26 that a portion of the first audio track comprising the inserted mkue 303 is to be compressed or encoded in a different manner than remainder of the media file 300 or in a different manner than remaining audio tracks. Accordingly, responsive to the flag 107, transcoder 26 may determine either: not to encode or compress at least a portion of the first audio track 313 that comprises one or more mkues 303, not to encode or compress the entire first audio track 313, or to encode or compress the first audio track 313 in a manner in which the inaudible cues of the mkues 303 are not significantly degraded, as to preserve their quality.

At step 930, transcoder 26 may transcode the media file 300 to encode the audio track, except for at least a portion of the first audio track 313. Transcoder 26 may transcode the media file 300, as to compress or encode the media file 300 into a particular condensed format. As determined at step 925, transcoder 26 may proceed to not encode, or compress, a portion of the first audio track 313A comprising an inserted mkue 303A, responsive to a flag 107. Similarly, in some embodiments, transcoder 26 may not encode, or compress, the entire first audio track 313A in which one or more mkues 303 are inserted, responsive to a flag 107 indicating that no compression of the first audio track 313 be implemented. Alternatively, transcoder 26 may determine to encode or compress the portion of the first audio track 313 differently from the remainder of the media file 300 in order to reduce the possibility of diminishing the quality of the inaudible cues in the mkue 303 in the first audio track 313. In some embodiments, transcoder 26 encodes or compresses the media file 300 into a lossy format, thereby diminishing some quality of the media file 300. In other embodiments, transcoder 26 encodes or compresses the media file 300 into lossless format. In some embodiments, transcoder 26 encodes or compresses the media file 300 into a lossy format, while encoding the first audio track into a lossless format in response to flag 107.

At step 935, transcoding machine 202 or the mkue portal 400 store the transcoded media file 300 into memory. In some embodiments, the transcoded media file 300 is stored into a content distribution server 250 or transcoding machine 202. In other embodiments, the transcoded media file 300 is stored into any one of servers or virtual machines of the mkue portal 400. In further embodiments, the transcoded media file 300 is stored into cache 280 or push notification server 900. Transcoded media file 300, which may also be referred to as mkue processed media file 300, may be stored in any memory, such as that of a memory device 25, in any of the aforementioned servers or computing devices.

At step 940, mkue portal 400 or content distribution server 250 receives a request from a consumer's mobile device 220 referencing an mkue 303 intercepted by a microphone of the consumer's mobile device from a media file 300 played in the consumer's vicinity. In some embodiments, any mkue portal 400 components receives a request, including: mkues API 420, content distribution server 250, cache server 280 or push notification server 900. The request may identify mkue 303. In some embodiments, the request includes a copy of a signature of the mkue 303 reconstructed from signals recorded by the consumer's mobile device 220. The signature may be reconstructed or put together by a mkue application 230. In other embodiments, the request includes descriptions of the mkue 303, such as the individual inaudible signal frequencies and amplitudes. In further embodiments, the request identifies all of the frequencies of the individual signals of the inaudible mkue 303. In still further embodiment, the request identifies the amplitudes of each of the individual signals. In yet further embodiments, the request identifies the time duration of each of the signals, information on when each of the signals is played and when it is not played, thereby depicting the mkue 303's inaudible signal progression through time.

At step 945, mkue API 420 of the mkue portal 400 or mkue API 255 of the content distribution server 250 determines if the mkue 303 referenced in the request received at step 940 relates to an event associated with a particular set of mkues. Mkue API 420 or Mkue API 255 may search through the mkues database 260 to find an mkue tag 270 whose mkue 303 matches the information about the mkue 303 referenced in the request at step 940. Upon finding a match, mkue API 420 or mkue API 255 may determine that the mkue 303 from the request is the mkue 303 identified by the match. Accordingly, mkue API 420 or mkue API 255 may identify the item corresponding to the matching mkue 303 and retrieve the item information 116 corresponding to the matching mkue 303. Once the matching mkue 303 is found, mkue API 420 or mkue API 255 may determine if the identified mkue 303 corresponds to a particular event. Mkue API 420 or Mkue API 255 may identify all the other mkues 303A-N that correspond to the same event. In some embodiments, a determination is made that the identified mkue 303 does not correspond to any events.

At step 950, in response to a determination at step 945 that the mkue 303 identified in the received request at step 940 relates to an event associated with a set of mkues 303, item information 116 for the requested matching mkue 303 as well as item information 116 for the other mkues associated with the event are sent to the consumer's device. In some embodiments, all item information 116 for all of the mkues 303A-N associated with the event are sent to the consumer's mobile device 220 simultaneously. In other embodiments, item information 116A-N of mkues 303A-N are sent to the end consumer's mobile device 220 one by one, per schedule of the scheduler 910, which may keep track of when the consumer will need each of the mkues 303 serviced. In further embodiments, item information 116A-N are sent to the consumer in the chronological order in which they are expected to be requested from the consumer's mobile device 220. In further embodiments, each of the mkues 303 is serviced to the end consumer using the push notification server 900 before the consumer's mobile device 220 even sends the request for any of the mkues 303. Item information 116A-N may include information on the item, such as webpage 114 for the item, a web site for purchasing the item, a web site for visiting the item, additional information on the item, information on the background or specifications of the item, product number, model and serial number of the product, address of a real estate property, a name of a celebrity, a description of a service or any other marketable feature that may be indicated by the mkue 303.

At step 955, in response to a determination at step 945 that mkue 303 identified in the request at step 940 does not relate to an event, item information 116 for the requested mkue 303 is sent to the end consumer's mobile device 220. Item information 116 pertaining to mkue 303 from the request may be sent to the consumer's mobile device 220. Item information may include information on the item, such as webpage 114 for the item, a web site for purchasing the item, a web site for visiting the item, additional information on the item, information on the background or specifications of the item, product number, model and serial number of the product, address of a real estate property, a name of a celebrity, a description of a service or any other marketable feature that may be indicated by the mkue 303.

What is claimed is:

1. A method for transcoding a media file, the method comprising:
    loading into a portion of memory, by a media transcoding machine, a first media file comprising one or more audio tracks arranged along a timeline, each track comprising digital audio data;
    loading into a portion of memory, by the media transcoding machine, an identifier identifying a location on the timeline of the first media file at which an item is to be presented;
    generating, by the media transcoding machine, an audio cue tag comprising an audio cue having two or more inaudible audio signals, the audio cue uniquely identifying the item, wherein the item is associated with a web page to be accessed by a mobile device in response to the mobile device identifying the two or more inaudible audio signals; and
    transcoding, by the media transcoding machine, the first media file, wherein transcoding includes: (i) encoding at least some of the one or more audio tracks, (ii) embedding the audio cue into a first audio track of the first media file, and (iii) determining not to compress at least a portion of the first audio track comprising the audio cue while compressing other portions of the first media file.

2. The method of claim 1, further comprising loading into a portion of memory, by the media transcoding machine, a collection of one or more timing markers corresponding to one or more identifiers at which one or more items are presented in the first media file and one or more audio cues corresponding to the one or more timing markers and transcoding the first media file to comprise the one or more audio cues at the one or more identifiers identified by the one or more timing markers.

3. The method of claim 1, further comprising the media transcoding machine determining not to compress at least the portion of the first audio track responsive to an indication that the first audio track is not to be compressed.

4. The method of claim 1, further comprising loading into the memory, by the media transcoding machine, the audio cue to be embedded into the first audio track at a location on a timeline of the first audio track indicated by a timing marker.

5. The method of claim 1, further comprising generating the audio cue tag that includes one or more of: a product identifier, a person's name, a country of origin, a geographic location data, and the audio cue.

6. The method of claim 1, wherein the generating of the audio cue tag is implemented responsive to determining that the audio cue tag for the item had not yet been created.

7. A tangible non-transitory computer-readable media containing instructions stored thereon to transcode a media file, which when executed by a hardware processor cause the hardware processor to:

load into a first portion of memory of a media transcoding machine a first media file comprising one or more audio tracks arranged along a timeline, each track comprising digital audio data;

load into a second portion of memory an identifier identifying the location on the timeline of the first media file at which an item is to be presented and an audio cue having two or more inaudible audio signals, the audio cue uniquely identifying the item, wherein the item is associated with a web page to be accessed by a mobile device in response to the mobile device identifying the two or more inaudible audio signals; and transcode the first media file such as to: (i) encode at least some of the one or more audio tracks, (ii) embed the audio cue into a first audio track of the first media file, and (iii) determine not to compress at least a portion of the first audio track comprising the audio cue while compressing other portions of the first media file.

8. The tangible non-transitory computer-readable media of claim 7 containing instructions stored thereon that, when executed by the hardware processor, further cause the hardware processor to load into a portion of memory a collection of one or more timing markers corresponding to one or more identifiers at which one or more items are presented in the first media file and one or more audio cues corresponding to the one or more timing markers and transcode the first media file to comprise the one or more audio cues at the one or more identifiers identified by the one or more timing markers.

9. The tangible non-transitory computer-readable media of claim 7 containing instructions stored thereon that, when executed by the hardware processor, further cause the hardware processor to determine not to compress at least the portion of the first audio track responsive to an indication that the first audio track is not to be compressed.

10. The tangible non-transitory computer-readable media of claim 7 containing instructions stored thereon thT, when executed by the hardware processor, further cause the hardware processor to embed the audio cue into the first audio track at a location on a timeline of the first audio track indicated by a timing marker.

11. The tangible non-transitory computer-readable media of claim 7 containing instructions stored thereon that, when executed by the hardware processor further cause the hardware processor to generate an audio cue tag that includes one or more of: a product identifier, a person's name, a country of origin, a geographic location data, and the audio cue.

12. The tangible non-transitory computer-readable media of claim 7 containing instructions stored thereon that, when executed by the hardware processor further cause the hardware processor to generate an audio cue tag responsive to determining that the audio cue tag for the item had not yet been created.

13. A system for transcoding a media file, the system comprising:

a media transcoding machine configured to:

load into a first portion of a memory of the media transcoding machine, a first media file comprising one or more audio tracks arranged along a timeline, each track comprising digital audio data;

load into a second portion of the memory of the media transcoding machine, an identifieridentifying the location on the timeline of the first media file at which an item is to be presented and audio cue having two or more inaudible audio signals, the audio cue uniquely identifying the item, wherein the item is associated with a web page to be accessed by a mobile device in response to the mobile device identifying the two or more inaudible audio signals; and transcode the first media file, wherein transcoding includes: (i) encoding at least some of the one or more audio tracks, (ii) embedding the audio cue into a first audio track of the first media file, and (iii) determining not to compress at least a portion of the first audio track comprising the audio cue while compressing other portions of the first media file.

14. The system of claim 13, wherein the media transcoding machine is further configured to load into a portion of memory a collection of one or more timing markers corresponding to one or more identifiers at which one or more items are presented in the first media file and one or more audio cues corresponding to the one or more timing markers and transcode the first media file to comprise the one or more audio cues at the one or more identifiers identified by the one or more timing markers.

15. The system of claim 13, wherein the media transcoding machine is further configured to determine not to compress at least the portion of the first audio track responsive to an indication that the first audio track is not to be compressed.

16. The system of claim 13, wherein the media transcoding machine comprises specialized hardware that is configured to advance transcoding of the media files.

17. The system of claim 13, wherein the media transcoding machine is further configured to load into memory the audio cue to be embedded into the first audio track at a location on a timeline of the first audio track indicated by a timing marker.

18. The system of claim 13, wherein the media transcoding machine is further configured to generate an audio cue tag that includes one or more of: a product identifier, a person's name, a country of origin, a geographic location data, and the audio cue.

19. The system of claim 13, wherein the media transcoding machine is further configured to generate an audio cue tag responsive to determining that the audio cue tag for the item had not yet been created.

20. A media file stored in a tangible non-transitory computer-readable media comprising:

a media file comprising an audio track and video content, the media file encoded to include a first copy of an inaudible cue inserted in the audio track at a location in a timeline of the media file at which a product appears in the video content and a second copy of the inaudible cue inserted into the audio track at a second location in the timeline that is offset from the first location by a predetermined time setting, wherein the inaudible cue uniquely identifies the product and corresponds to a universal product code of the product that is retrieved in response to the media file being broadcast via a sound speaker of an output device, the universal product code comprising a numerical identification of a manufacturer of the product and a numerical identification of the product.

* * * * *